(12) United States Patent
Jitkoff et al.

(10) Patent No.: US 8,904,163 B2
(45) Date of Patent: Dec. 2, 2014

(54) CONTEXTUAL HISTORY OF COMPUTING OBJECTS

(71) Applicant: Google Inc., Mountain View, CA (US)

(72) Inventors: John Nicholas Jitkoff, Palo Alto, CA (US); Kan Liu, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/243,537

(22) Filed: Apr. 2, 2014

(65) Prior Publication Data

US 2014/0223450 A1    Aug. 7, 2014

Related U.S. Application Data

(63) Continuation of application No. 13/300,391, filed on Nov. 18, 2011, now Pat. No. 8,732,447.

(60) Provisional application No. 61/415,243, filed on Nov. 18, 2010.

(51) Int. Cl.
*G06F 15/177* (2006.01)
*G06F 9/44* (2006.01)
*G06F 1/32* (2006.01)

(52) U.S. Cl.
CPC ............ *G06F 9/4443* (2013.01); *G06F 1/3203* (2013.01); *G06F 1/3228* (2013.01); *G06F 1/3246* (2013.01); *G06F 1/3265* (2013.01); *G06F 1/3287* (2013.01); *G06F 9/4418* (2013.01); *Y02B 60/1282* (2013.01); *Y02B 60/32* (2013.01); *Y02B 60/1242* (2013.01)
USPC .......................................................... 713/2

(58) Field of Classification Search
CPC ... G06F 9/4443; G06F 9/4418; G06F 1/3203; G06F 1/3228; G06F 1/3246; G06F 1/3265; G06F 1/3287; Y02B 60/1282; Y02B 60/32; Y02B 60/1242
USPC ........................................................ 713/1, 2
See application file for complete search history.

(56) References Cited

U.S. PATENT DOCUMENTS 5,504,907 A   4/1996   Stewart et al.
5,926,404 A   7/1999   Zeller et al.
(Continued)

FOREIGN PATENT DOCUMENTS

EP   1 617 315    1/2006
JP   H08-314679   11/1996
(Continued)

OTHER PUBLICATIONS

Office Action for Japanese Application No. 2013-540092, mailed Jun. 9, 2014, 7 pages (with English translation).

(Continued)

*Primary Examiner* — Mark Connolly
(74) *Attorney, Agent, or Firm* — Fish & Richardson P.C.

(57) ABSTRACT

Various features for a computer operating system include mechanisms for operating where a single native application, in the form of a Web browser, exists for an operating system, and all other applications run as Web apps of the browser application. A computer-implemented object tracking method includes instantiating, a first time, an operating system object on a computing device; automatically identifying contextual meta data that defines a state of objects that are open on the computing device, other than the instantiated operating system object, when the operating system object is instantiated; and storing the identifying contextual meta data in correlation with the operating system object, wherein the contextual meta data identifies one or more objects that are active in the operating system when the operating system object is instantiated.

20 Claims, 19 Drawing Sheets

(56) References Cited

U.S. PATENT DOCUMENTS

| | | | |
|---|---|---|---|
| 6,243,819 | B1 | 6/2001 | Jung |
| 7,313,120 | B2 | 12/2007 | Ekberg et al. |
| 7,383,457 | B1 | 6/2008 | Knight |
| 2003/0074590 | A1 | 4/2003 | Fogle et al. |
| 2005/0156922 | A1 | 7/2005 | Lee |
| 2005/0268301 | A1 | 12/2005 | Kelley et al. |
| 2005/0278557 | A1 | 12/2005 | Asoh et al. |
| 2006/0047980 | A1 | 3/2006 | Price et al. |
| 2007/0050654 | A1 | 3/2007 | Switzer et al. |
| 2007/0162779 | A1 | 7/2007 | Downer et al. |
| 2010/0120477 | A1 | 5/2010 | Imai |
| 2013/0073568 | A1 | 3/2013 | Federov et al. |
| 2014/0143791 | A1* | 5/2014 | Mark et al. .................... 719/318 |

FOREIGN PATENT DOCUMENTS

| | | |
|---|---|---|
| JP | H09-006582 | 1/1997 |
| JP | H10-333926 | 12/1998 |
| JP | 2000-099076 | 4/2000 |
| JP | 2005-005909 | 1/2005 |
| JP | 2005-227951 | 8/2005 |
| JP | 2006-287458 | 10/2006 |

OTHER PUBLICATIONS

International Search Report and Written Opinion in International Application No. PCT/US2011/061556, dated Mar. 2, 2012, 15 pages.

International Search Report and Written Opinion in International Application No. PCT/US2011/061560, dated Apr. 11, 2012, 13 pages.

International Preliminary Report on Patentability in International Application No. PCT/US2011/061560, dated May 30, 2013, 9 pages.

Dey et al. SmarTech [online]. "A Context-Based Infrastructure for Smart Environments," 1999, [retrieved on Nov. 29, 2011]. Retrieved from the Internet: <URL: http://smartech.gatech.edu/handle/1853/3406>. 15 pages.

Dey, A. K. "Context-Aware Computing: The CyberDesk Project" in: *Proceedings of the AAAI 1998 Spring Symposium on Intelligent Environments*. Technical Report. (Palo Alto, AAAI Press, 1998), pp. 51-54.

Endler and Schmidt (Eds). Ranganathan and Campbell. "A Middleware for Context-Aware Agents in Ubiquitous Computing Environments" in: Middleware 2003, LNCS 2672 (Laxenburg, IFIP, 2003), pp. 143-161.

Gustavsen, R. M. "Condor—An Application Framework for Mobility-based Context-aware Applications." Position Paper for the UBICOMP 2002 Workshop, Gothenburg, Sweden, Sep. 2002, 6 pages.

Henricksen and Indulska. "A Software Engineering Framework for Context-Aware Pervasive Computing." Pervasive Computing and Communications—Proceedings of the Second IEEE Annual Conference on Pervasive Computing and Communications, 2004, 10 pages.

Henricksen and Indulska. "Developing Context-Aware Pervasive Computing Applications: Models and Approach." *Pervasive and Mobile Computing*, vol. 2, Issue 1, Feb. 2006, 32 pages.

Lieberman et al. "Out of Context: Computer Systems that Adapt to, and Learn from, Context." IBM *Systems Journal*, vol. 39, Nos. 3&4, 2000, pp. 617-632.

Schilit, W. N. "A System Architecture for Context-Aware Mobile Computing." Academic Paper, Philosophy Department—Graduate School of Arts and Sciences, Columbia University, 1995, 153 pages.

Tarasewich. AIS Electronic Library (AlSel)—Proceedings of AMCIS [online]. "Towards a Comprehensive Model of Context for Mobile and Wireless Computing," 2003, [retrieved on Nov. 29, 2011]. Retrieved from the Internet: <URL: http://aisel.aisnet.org/amcis2003/15/>. pp. 114-124.

Winograd. "Architectures for Context." *Human-Computer Interaction*, vol. 16, 2001, pp. 401-419.

\* cited by examiner

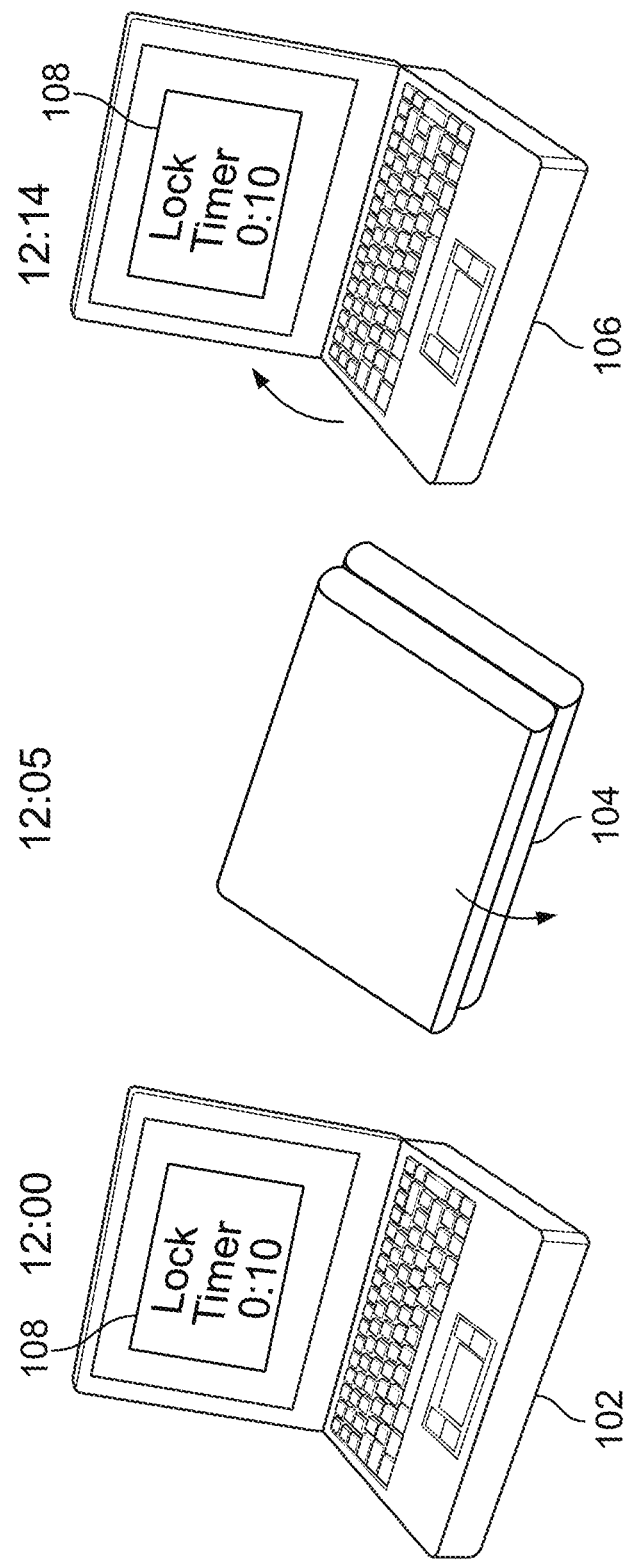

CONTEXTUAL HISTORY OF COMPUTING OBJECTS

CROSS-REFERENCE TO RELATED APPLICATION

The present application is a continuation of U.S. application Ser. No. 13/300,391, titled "Contextual History of Computing Objects", filed on Nov. 18, 2011, which claims priority to U.S. Provisional Application Ser. No. 61/415,243, titled "User Interaction in a Computer Operating System," filed on Nov. 18, 2010, the contents of which are incorporated by reference as if set forth fully herein.

TECHNICAL FIELD

This document relates to systems and techniques for interacting with users of a computer operating system.

BACKGROUND

The core structures by which a computer (e.g., a desktop PC, laptop, netbook, tablet, or smart phone) operates may include a basic input and output system, or BIOS, an operating system, and other components that may be referred to as occupying a "stack" of software that provides basic functionality for operating a computer. The BIOS may be accessed when a computer is first turned on and booted, and can provide basic functionality for the computer, such as identifying, testing, and initializing system devices, including storage devices that store code that is further needed to boot the computer. The code for the operating system can be stored on such an additional device, and can provide for further booting of the computer until it is fully booted and ready to operate.

An operating system generally serves as an interface between the computer hardware and a user of the computer, and between the hardware and applications that a user loads onto a computer. An operating system may provide a variety of functions. For example, the operating system can provide a graphical user interface (GUI) by which a user of the computer may receive output from the computer and may provide input to the computer. The operating system may also provide a platform on which various third-party applications execute, where the operating system provides services that are needed by the applications, and also provides the mechanism by which the applications can communicate with other resources, such as other applications, peripheral devices (e.g., printers, cameras, etc.), and with services provided by the operating system itself.

SUMMARY

This document describes systems and techniques that may be implemented as part of an operating system for a computing device, or in a system that includes a number of different computing devices. For example, various mechanisms may be used to synchronize a computing device with data stored in a cloud-based system, whereby a hosted computer server system is made available for members of the public to access the system, and the system in turn provides various services such as data storage and back-up, document storage, e-mail routing and handling, and other useful services. The computing device may be of a form that has relatively little local storage, and that thus stores a user's data at the hosted server system. In addition, the device may be configured so that it is essentially constantly connected to a network (e.g., a wireless network) and via the network to the internet. As a result, various components on the device may be arranged to operate according to a nearly always-on approach For example, in certain implementations described below, a computer may take "snapshots" at various points in time to record what objects (e.g., applications, programs, files) are being used at the same time. From these "snapshots," an inference can be made that a user prefers to have certain objects open on his or her computer at the same time. For instance, a user may prefer to listen to music when working on a word processing document. As such, when the user opens a word processing document, the computer would recognize that numerous "snapshots" have been taken in which both a music program and a word processing program are open at the same time. In another example, a user may be working on a certain word processing document. A previously-recorded "snapshot" may indicate that when the word processing document was created, a persistent search object was also active on the computer. Such a concurrence may indicate that the document was created by the user to contain information generated by the persistent search. A further stronger inference in that regard may be formed, for example, if the user copied the information to a clipboard from the persistent search results, created the document, and then pasted the search results or other copied data into the document. This information may also be stored in association with the word processing document as meta data.

More specifically, an electronic recorder may be implemented as part of the operating system of a computing device. The recorder may monitor processes on the device, and may be programmed to consult a list of activities that are considered to be relevant activities for logging on the device. For example, the instantiation of any application on the device, the loading of a media file (e.g., playing of a song, or movie), or the start of a communication session such as a chat session, and other such events may by checked the recorder. When the recorder recognizes a relevant event, it may take a snapshot of the current state of the device, such as recording which other applications are open, what web pages are currently loaded, what other users are currently being communicated with, and the like. The recorder may log such points about the current state, and may do so repeatedly when other such events are recognized on the system. Also substantially simultaneously, when such an event occurs, the system may search the logs for previous instances of the same or similar events occurring, and may identify details of the state of the device when those events occurred. The system may then automatically instantiate certain of the details (e.g., opening applications that were open at the prior time, opening web pages or other content sources that were open at the prior time, contacting users with whom conversations were occurring at the prior time). Alternatively, the operating system may display a list of such aspects of the prior state, the user may select one or more of the aspects, and the system may then instantiate the selected aspects.

In certain implementations, such systems and techniques may provide one or more advantages. For example, user interaction with the computer system could provide more information regarding the user's personal preferences when using the computer system without explicitly asking the user to submit his or her preferences. Instead, such preferences could be inferred through behavioral trends. Additionally, the user can save time by only having to click to open one object instead of multiple objects because the computer would recognize that the user prefers to have certain objects open at the same time and automatically open other objects for the user after she has opened a first object.

In some embodiments, a computer-implemented object tracking method includes instantiating, a first time, an operating system object on a computing device; automatically identifying contextual meta data that defines a state of objects that are open on the computing device, other than the instantiated operating system object, when the operating system object is instantiated; and storing the identifying contextual meta data in correlation with the operating system object, wherein the contextual meta data identifies one or more objects that are active in the operating system when the operating system object is instantiated. Some implementations further comprise receiving a subsequent request to instantiate the operating system object when the operating system object is closed, and calling secondary objects that are identified in the contextual meta data.

In some instances, calling secondary objects comprises launching one or more applications that were open when the operating system object was first instantiated. The method may further comprise adding, to the stored contextual meta data, information corresponding to objects that are active when the subsequent request is received. Additionally, the method may comprise identifying user interactions with objects other than the operating system object while the operating system object is instantiated, and adding to the stored contextual meta data, information about the user interactions.

The details of one or more embodiments are set forth in the accompanying drawings and the description below. Other features and advantages will be apparent from the description and drawings, and from the claims.

DESCRIPTION OF DRAWINGS

FIG. 1 is a conceptual diagram of a process for providing delayed locking of a computing device.

Like reference symbols in the various drawings indicate like elements.

DETAILED DESCRIPTION

Figure 2A:
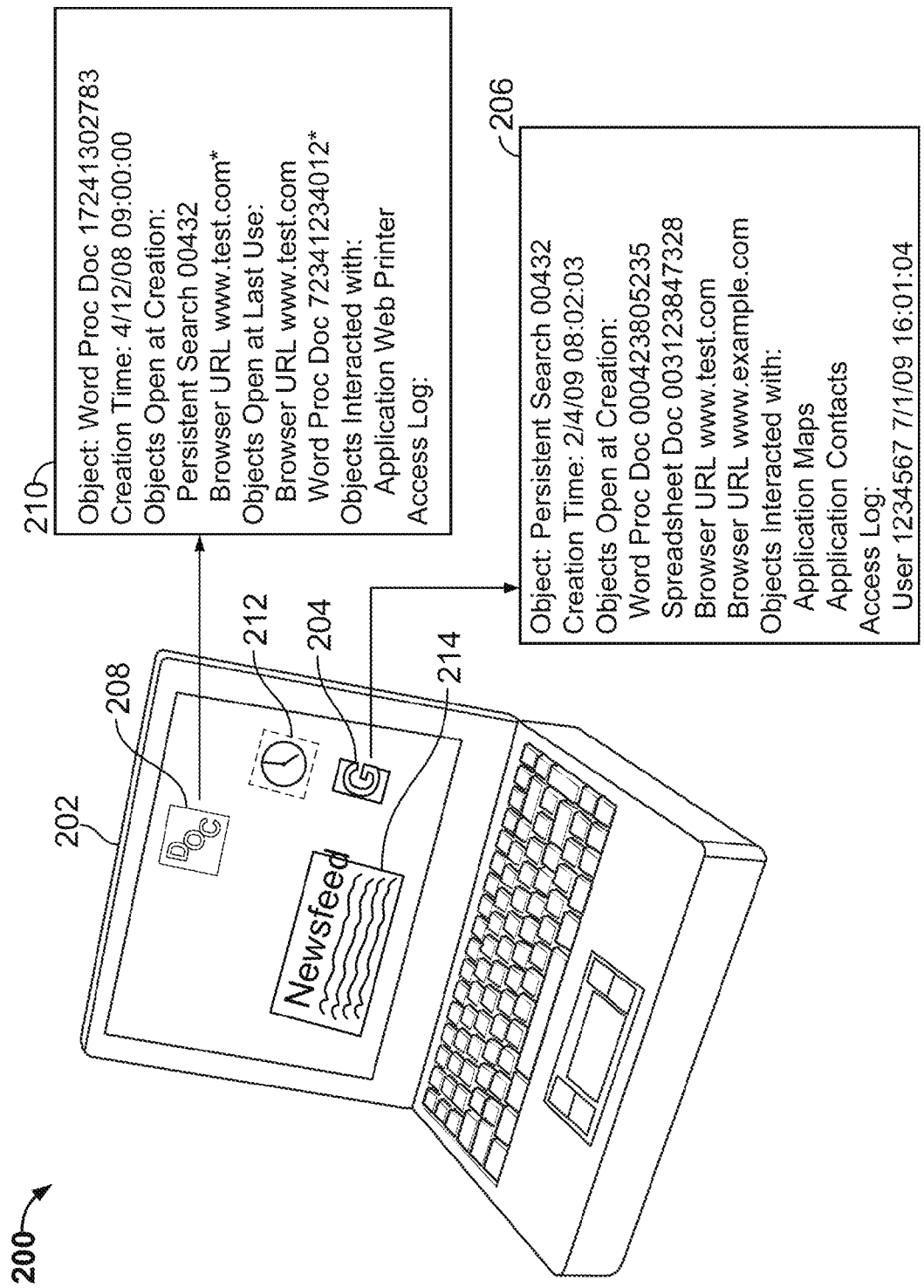
FIG. 2A is a conceptual diagram of a operating system that uses contextual objects.

This document describes systems and techniques for providing interaction with a user of a computing device, such as a mobile smart phone, using, for example, elements of an operating system that runs on the device. The system and techniques may provide various operating system components that may communicate with, and be served from, one or more hosted server systems. In particular, the operating system may be designed so that it is run with an internet connection most of the time it is executing. As a result, many of the operations performed by the operating system may be designed to assume that a network connection is available, and to rely on caching techniques or other bridging approaches until a network connection can be restore. In particular, the devices described here may have nearly always-connected wireless data interfaces that communicate with data portions of one or more cellular telephone networks to reach the internet.

FIG. 1 is a conceptual diagram of a system for providing delayed locking of a computing device. In general, the system provides a mechanism for allowing the user of a portable computing device to take actions to shut down the portable computing device, though without immediately shutting down the device. As a result, if the user changes his or her mind soon after taking such actions, the user may re-activate the device without having to take other steps that, but for this feature, would have otherwise been required if the device were to shut down immediately upon the user taking such actions.

In the figure, three different states of a portable computing device, in this case a laptop computer having a clamshell design, are shown. In a first stage 102, the computer is open and operating, and the time is 12 o'clock noon. A display 108 on the computer indicates that a lock timer has been set to 10 seconds. The display 108 is provided by way of example here, though in actual usage, the device would not display the amount left on the timer, and the timer would not have begun operating at the point shown by state 102.

At state 104, after five seconds, the display is closed to the base of the computer—an action that would normally cause the computer to begin immediately going into a hibernate or other form of inactive mode. Such change would include powering down a microprocessor on the computer, turning off the display 108, turning off a cooling fan and other associated mechanisms, powering down a graphical processing unit (GPU), and performance of other power saving techniques on the device. Although not shown by the state 104, the device has not fully powered down or begun the power down when if has been closed for only a few seconds, because in this example, the device has a built-in delay of 10 seconds before it will even begin a shut-down sequence (and there may even be some indeterminate time after that sequence starts until the device passes the point that it can be reactivated without substantial user involvement such as entering an unlocking password). Instead, a limited number of features may be powered down, such as by switching off the display 108, so as to give the user the impression that the device is powering down. But re-activating the device may not, at this point, require anything more than opening the device again.

After 14 seconds and 9 seconds after closing the device, at state 106, the device is opened up, for example, because the user of the device decided that they did not want to stop using the device, and instead needed to perform additional work using the device. Because the timer was set to expire after 10 seconds, the device has not yet transitioned into its hibernating or other powered down state. Instead, all systems on the device that take a substantial amount of time to power back up have stayed powered up, and only limited systems have been powered down, such as the display 108. Also in this example, the timer has been reset to 10 seconds again, so that if the user closes the device again, it will not begin going into a hibernate or other inactive mode for 10 seconds after the closing. In certain embodiments also, the device may immediate go to sleep in response of one input and not to another. For example, entry of a control key combination may cause the device to go to sleep immediately, and entry of such a combination may be assumed to be more intentional by a user. In contrast, closing of a clamshell device may implement a predetermined delay, as such action may be more likely to be intended as a temporary action (e.g., as a user moves the device from one place to the next).

The particular delay time for beginning a process of powering down a device may be set by a user of the device. For example, if the user does not want to maximize battery savings, and frequently closes their computer and then immediately or soon after determines that they would like to begin working on their computer again, the user may set a relatively long period for the timer to count down before the device begins to power down its various systems to go into a sleeping or hibernate mode.

While the device here is shown as having a clamshell arrangement, which would include a switch near the hinge of the computer, so that the switch may be depressed when the clamshell is close and they computer may determine to go into a power down mode, other implementations may also be used. For example, a flat touchscreen tablet or slate computer may allow a user to power it down by pressing a power button on a front surface, back surface, or peripheral edge of the device. Such an action may cause a display on the device to turn off immediately so as to give a user the impression that the device is fully powering down. However, other subsystems on the device, such as a microprocessor, memory controllers, graphical processing unit, and other such subsystems may stay on for the duration of a timeout delay, as discussed above.

Apart from powering down systems, the timer may be used to delay the onset of a security apparatus being reset on a computing device like that shown. For example, certain computing devices may be arranged so that, when they are placed into a sleep mode or other inactive mode, a password or other security mechanism will be required by a user to bring the device back into fully active mode. Without the timer discussed here, a user may be forced to reenter their password if they close their device or otherwise inactivate it, and then quickly remember that they need to use the device again. With a timer, such as the timer implementation discussed here, the user may press a button or open their device quickly after they have done something to inactivate it and they may have a homepage or desktop for the device displayed nearly immediately to them, without a need for them to reenter their password or other credentialing information to unlock the device. In short, transition from an unlocked state to a locked state on the device may be intentionally delayed a determined, and user selectable time period.

In this manner, the systems and methods described here can provide for a more convenient user experience with a computing device. The device may delay its powering down slightly after he user has indicated a command to power down, and such delay may be used to allow the device to power up quickly if the user changes his or her mind quickly. At the same time, the power down delay may be relatively short, so that no excess battery power is used up for the device.

FIG. 2A is a conceptual diagram of an operating system that uses contextual objects. In general, a contextual object is an operating system object that has stored with it, or for it, information about a context in which the object has previously existed in the operating system, including by describing other objects that have been present and active in the operating system when the first object has been created and or active in the operating system. For example, in certain implementations described below, a computer may take "snapshots" at various points in time to record what objects (e.g., applications, programs, files) are being used at the same time. From these "snapshots" an inference can be made that a user prefers to have certain objects open on his or her computer at the same time.

In the figure, a computer 202 is shown in the form of a basic clamshell laptop computer, though the computer 202 may take other forms, such as a smart phone, touch-screen tablet, or slate device. A number of visual representations of objects are shown on the screen of the computer 202, and include icons and representations of applications loaded on the computer 202. For example, an icon 208 represents a particular word processing document that is accessible from the computer 202, such as by being stored on persistent storage on the computer 202, or at a server system that is accessible from computer 202. For example, computer 202 may store a cookie or other mechanism by which it may identify itself to a server system to indicate an account with the server system registered to a user of the computer 202. Such mechanisms may be used by computer 202 in order to obtain information from the server system, such as to obtain data that represents the document of icon 208. A user may then call up the document by selecting the icon 208.

A widget or gadget 212 is represented by a clock on the display of computer 202, and indicates a type of object that may also be displayed on the computer 202. The widget or gadget 212 may take a variety of familiar forms and may be provided as code from third parties who draft applications to supplement functionality that is otherwise available on an operating system loaded on device 202. News feed 214 represents an active application that is running on device 202, in the form of a news aggregator that shows recent current event updates to a user of computer 202.

Icon 204 represents an object in the form of a persistent search to be performed by computer 202. A persistent search is a search that is repeated automatically by a device such as computer 202. For example, a user who is planning a vacation to Europe may establish a persistent search of airline flights to Europe, so that the user may immediately be notified if a flight becomes available at a certain price.

Boxes 206, 210 indicate contextual data that may be saved in association with one of objects 208 and 204. For example, box 210 indicates contextual information for a document or word processing document such as document 208. Various fields are shown in the box 210 to indicate the type of contextual information that may be saved with the object. For example, the object includes a name that describes the type of object that it is, and an identification number that uniquely identifies the object with respect to all other objects stored on the computer 202.

The box 210 also shows a time at which the object was initially created, and a list of objects that were also open on the computer 202 when the object 208 was created. In addition, the box 210 includes a list of other objects that were open the last time the object 208 was used. In this example, a user was reviewing the website www.test.com both when the word processing object 208 was created and the last time it was used. Also, when the word processing document was created, the persistent search object 204 was active on the computer 202. Such a concurrence may indicate that the document was created by the user to contain information generated by the persistent search. A further stronger inference in that regard may be formed, for example, if the user copied the information to a clipboard from the persistent search results, created the document, and then pasted the search results or other copied data into the document. Such information may also be stored in association with the object 208, as shown in box 210 (e.g., by determining when the document is last saved, what information in the document is shared by other applications that are open at the time, thus indicating that content was copied between the document and the object).

The box 210 also shows objects that the document object 208 has interacted with. In this example, the document 208 has interacted with an application web printer, which may indicate that the document 208 has been printed out on that printer. Particular direct interactions between objects may be stored, because they may provide an indication of especially strong connections between the object and other objects. Such connections may be used to identify a user who is an intended user of an object in particular situations.

Box 206 indicates contextual information that has been stored in associated with object 204. Again, the object's named includes a unique identification number, along with a time at which the object was created. As indicated in box 206, four different other objects were active when the persistent search object 204 was created. Those other objects include a word processing document, a spreadsheet document, and two different webpages that were being viewed on the computer 202 when the persistent search object was created. Also, box 206 indicates that the persistent search object has interacted with a mapping application and a contacts application on the computer 202. Also, an access log indicates the times at which the object has been accessed by a user and may also include information indicating what the user did with the object.

Using the information shown here, a variety of services may be provided to a user with computer 202. For example, when object 208 is next launched on the computer 202, the computer 202 may look at the information box 210 (actually to data stored on the computer 202 or another device, though box 210 represents such data in this figure) to determine that a user of the device 202 frequently has had the www.test.com webpage opened in a browser when the particular document has also been open for word processing. Such a determination may be used in appropriate circumstances to automatically launch the browser with that webpage active in the browser, when the document is opened. In such a manner, the user may cause multiple inferentially-related applications to be activated by selecting only one icon for one of the applications. In some implementations, the computer 202 may request the user's permission before instantiating an object in response to stored meta data. If the user provides permission, the object is instantiated. If the user denies permission, the program is not instantiated. The computer 202 may further store the user's history of providing or denying such permission in meta data.

Figure 2B:
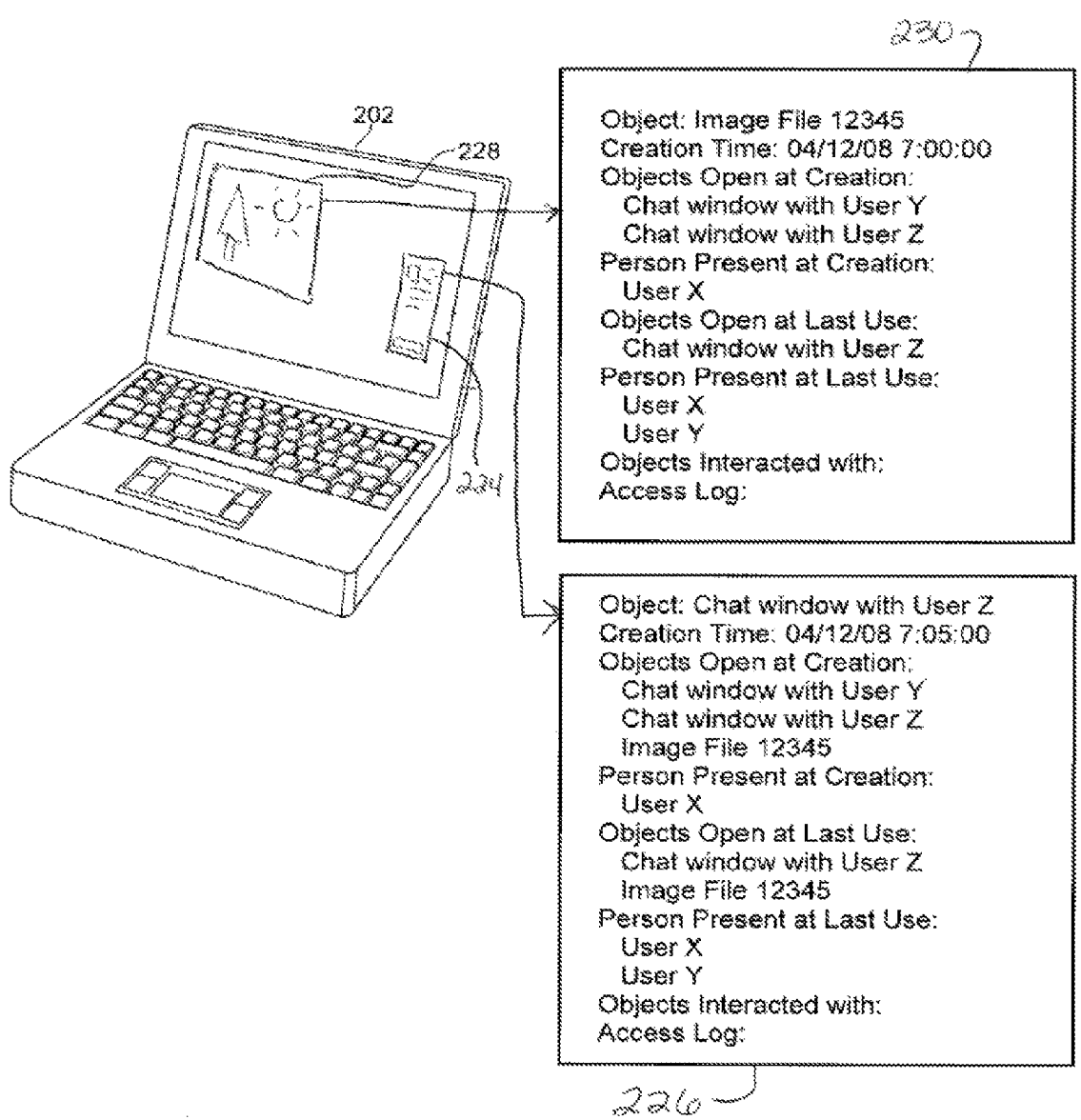
FIG. 2B is a conceptual diagram of an alternative embodiment of an operating system that uses contextual objects.

FIG. 2B is a conceptual diagram of an operating system that uses contextual objects, similar to FIG. 2A. In the figure, an icon 228 represents a particular image file that is accessible from the computer 202, such as by being stored on persistent storage on the computer 202, or at a server system that is accessible from computer 202. For example, computer 202 may store a cookie or other mechanism by which it may identify itself to a server system to indicate an account with the server system registered to a user of the computer 202. Such mechanisms may be used by computer 202 in order to obtain information from the server system, such as to obtain data that represents the document of icon 208. A user may then call up the document by selecting the icon 228.

Icon 224 represents an object in the form of a chat window. A chat window permits a user to communicate with another user of a computing device, such as a computer or smart phone. In some instances, chat programs allow two or more people to communicate by typing written messages back and forth. In other instances, chat programs facilitate the sending and receiving of audio or video for chatting.

Boxes 226, 230 indicate contextual data that may be saved in association with one of objects 228 and 224. For example, box 230 indicates contextual information for a document or word processing document such as image file 228. Various fields are shown in the box 230 to indicate the type of contextual information that may be saved with the object. For example, the object includes a name that describes the type of object that it is, and an identification number that uniquely identifies the object with respect to all other objects stored on the computer 202.

The box 230 also shows a time at which the object was initially created, and a list of objects that were also open on the computer 202 when the object 228 was created. In addition, the box 230 includes a list of other objects that were open the last time the object 228 was used and a list of the people present when the object was created and last in use. Different methods may be used to determine the parties present when the object was created and used. For example, the program running the object may request user input for the parties present. In another example, the computer 202 may automatically determine which parties are present by sensing a user's voice based on a stored database or by detecting a device associated with certain individuals based on a stored database.

Referring to FIG. 2B, User X was chatting with User Y and with User Z when the object was created, as indicated by box 230. User X was chatting with User Z the last time the object was used. Box 230 further indicates that User X was present at the time the object was created and that User X and User Y were both present the last time the object was in use. The users present may be identified as using the computer 202 even though only one of the users may actually be "driving," as in making selections with a mouse or touchpad and entering text with a keyboard or other input device. In this way, individuals who are nearby (i.e., in the same room as the computer 202 or within a certain distance—for example 15 feet—from the computer 202) may be included as using the computer where a computer 202 automatically determines the parties who are present. In other instances, users present may affirmatively identify themselves as using the computer 202, either when prompted by the computer 202 or on their own accord.

Such a concurrence may indicate that the image file was created by User X with input from User Y and User Z. A further stronger inference in that regard may be formed, for example, if the user copied the information to a clipboard from the persistent search results, created the document, and then pasted the search results or other copied data into the document. Such information suggesting that the object was created through collaboration among User X, User Y, and User Z may also be stored in association with the object 228, as shown in box 230.

Box 226 indicates contextual information that has been stored in associated with object 224. The object's named includes a time at which the object was created. In this example, the chat window may indicate who the chat is with, which uniquely identifies the object. The object may include an identification number that uniquely identifies the object with respect to other objects on the computer. As indicated in box 226, two different other objects were active when the chat window 224 was created. Those other objects include an image file and another chat window that were being viewed on the computer 202 when the chat window object was created.

Using the information shown here, a variety of services may be provided to a user with computer 202. For example, when object 228 is next launched on the computer 202, the computer 202 may look at the information box 230 (actually to data stored on the computer 202 or another device, though box 230 represents such data in this figure) to determine that User X of device 202 frequently collaborates with User Y and User Z when working on this particular image file. Such a determination may be used in appropriate circumstances to automatically launch chat windows with User Y and/or User Z when the image file is opened. In such a manner, User X may cause multiple inferentially-related applications to be activated by selecting only one icon for one of the applications.

Similarly, when object 224 is next launched, initiating a chat between User X and User Z, a further chat window with User Y and/or the image file object 228 may be launched by analyzing the information in box 226.

In another implementation, the computer 202 may identify certain users using the computer (individuals may be identified as "using the computer," for example, when a user is prompted to enter his or her identity to the computer 202 or when the computer 202 senses one or more users nearby or within a certain distance from the computer 202). For example, in a scenario involving FIG. 2B, the computer may sense the presence of User X with User Y and/or User Z. As box 230 identifies object 228 as commonly being collaborated on by User X, User Y, and User Z, the presence of one or more of these parties, when detected by the computer 202, may prompt the computer 202 to automatically load object 228. In some embodiments, the object 228 will not be automatically loaded by the computer 202 unless the presence of at least two of persons identified in the contextual meta data of the object 228 is present when the operating system object is closed. In response to receiving the indication of at least one of—or in some instances, at least two of—the persons identified in the contextual meta data of the object), the computer 202 instantiates the operating system object 228.

Various other implementations involving different computer programs and applications may be used. For example, a user may prefer to listen to music while using a word processing program. As such, a computer may take note of such a trend (using meta described with respect to the boxes above) and automatically instantiate a music-playing program whenever the user opens the word processing program. Another user may prefer listening to a particular album or artist when working in word processing programs. In these cases, a computer may recognize the user's preference from her past use of the program (or past accessing of particular word processing documents) and automatically instantiate a music-playing program and automatically start playing the user's preferred artist, album, or song.

In other instances, a computer may store meta data that a user tends to close or shut down certain programs or objects when other programs or objects are instantiated. For example, a user may tend to close a media player whenever a chat window is instantiated. A user in this scenario may find the media being played on the media player to be distracting while trying to maintain a conversation using a chat application. As such, the user shuts down the media player program shortly after starting a conversation in a chat window. A computer may take note of this trend (using meta described with respect to the boxes above) and automatically shut down the media player (and possibly other similar media players) whenever the chat window is instantiated. In some instances, the computer may shut down the media player whenever any chat window is instantiated. In other examples, the computer may only shut down the media player if the instantiated chat window comprises a chat with certain individuals. Such a determination may be based on the meta data stored with respect to the chat application in general or meta data stored with respect to interactions with specific people using the chat application. The user may also provider his or her own personal settings or preferences.

Figure 3:
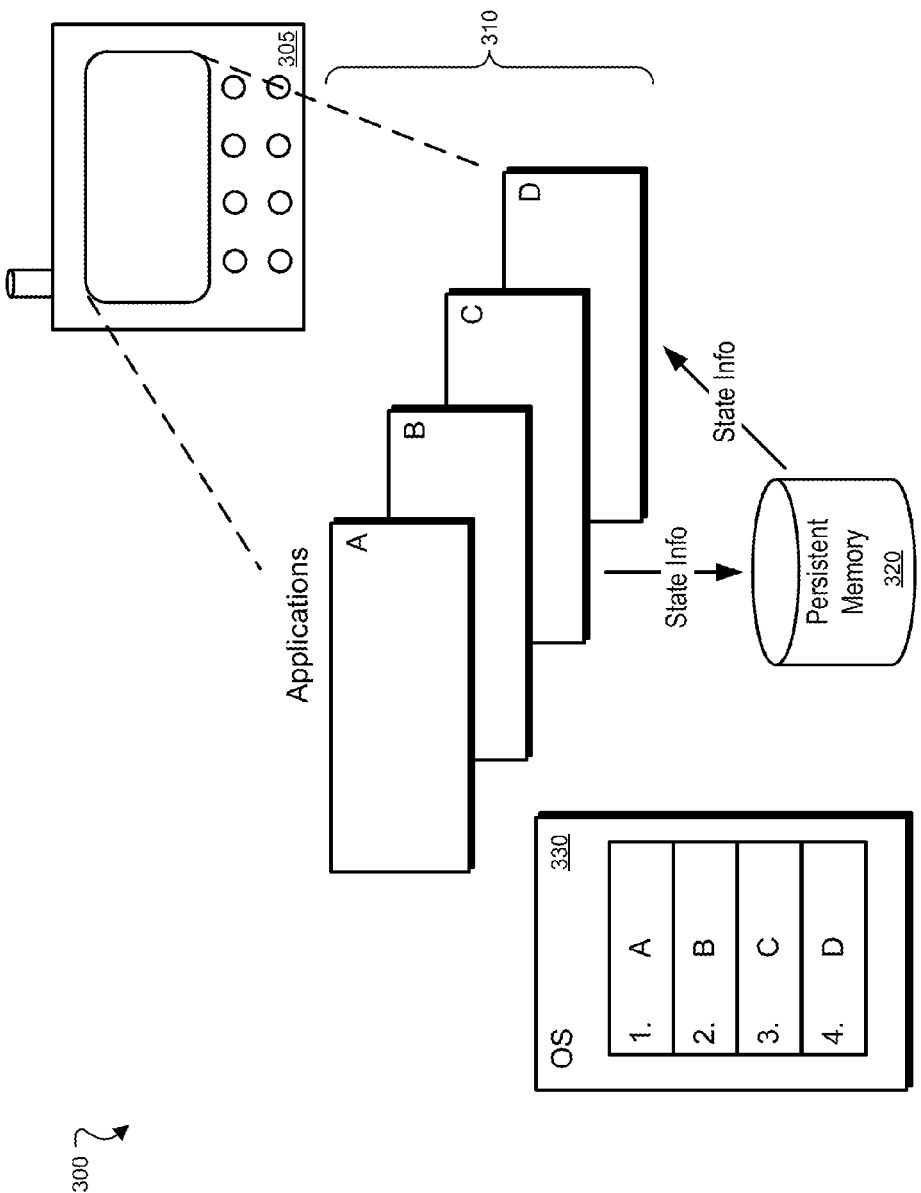
FIG. 3 is a conceptual diagram of a system for maintaining memory control on a computing device.

FIG. 3 is a conceptual diagram of a system 300 for maintaining memory control on a computing device 305. The illustrative system 300 may include an operating system 330 that controls the execution of software applications 310 on the device 305. In one implementation, the device 105 may be a cellular telephone containing an operating system 330 capable of executing several software applications simultaneously. In alternative implementations, the computing device 305 may be a laptop, personal computer, personal digital assistant, or other appropriate computing device.

In one implementation where the device 305 is a telephone, after turning on the telephone, the telephone's operating system 330 may be loaded from persistent memory 320 and may present a graphical user interface containing a predetermined display of icons to the user. Each icon can be either an application or a proxy for an application available to the user; when selected, a chosen icon may, if necessary, pass the associated application's parameters and file location in memory to the operating system 330, which, in turn, can execute the application 310. Each executed application uses a segment of the telephone's persistent memory 320; as an application continues to run, its memory requirements may increase. As the user executes more applications 310, or the running applications 310 consume additional memory, the telephone's memory 320 may eventually become inadequate to accommodate the memory demands of the applications 310.

In an exemplary implementation, the memory management system 300 may respond to memory shortages by terminating one or more applications 310 when persistent memory 320 has been exhausted and reviving the terminated application when the user returns to the application. In certain implementations, because the terminated application window may be either fully or partially obscured by another application window, the user may not be aware that the application has been terminated. When a user chooses to switch back to the application, the application may be re-launched and the user may not know that the application was temporarily terminated aside from perhaps a sluggish response in displaying the application.

In an illustrative implementation, the operating system 330 can rank the applications 310 according to a user's interactions with the graphical user interface, and each application 310 may generate and save information regarding its current state in response to a signal from the operating system. The applications may save such state information themselves or may provide the information to the operating system 330, which may in turn save the information to persistent storage (e.g., flash memory).

If memory 320 is exhausted, the operating system 330 may terminate one or more ranked applications 310 and later recreate the terminated applications in response to a user request. For example, once the operating system 330 has loaded, the user may select a document viewing application to read a stored document. Subsequently, while the document viewer is still running, the user may open a web browser and begin surfing the Internet. In the midst of the web browsing session, the user, in response to a notification that an email has arrived, may select the telephone's email application to review the new email. As the user is reading the email, the user may attempt to run a calendar application to create a reminder for an event mentioned in the email.

In an exemplary implementation, as the user opens new applications, the operating system 330 may rank the applications 310 according to one or more dynamic criteria. Here, the operating system 330 might rank the running applications 310, in descending order of importance, in the following manner: email application, web browser, and document viewer. Such ordering may occur in various ways. For example, the applications may be separated into various categories, such as necessary business applications, entertainment applications, etc. In some implementations, the operating system 330 may recognize that a particular application lays dormant when it is in the background, so it may classify that application as low priority. But another application may be constantly accessing information over a network (e.g., a messaging program) and may thus be ranked as a higher priority application. In some implementations, applications are divided into two categories: visible and invisible applications. Invisible applications (i.e., those applications whose windows are not visible to the user) are ranked lower than visible applications. In an alternative implementation, the developers of the applications may self-classify the applications or the user may classify or otherwise rank the applications, and such classifications or rankings may be provided to the operating system 330.

As the user interacts with the applications 310, each application may generate and save information regarding the current state of the application. For example, when an application enters a state where it could be killed by the operating system 330 at any time (e.g., the application is no longer visible to the user) the operating system 330 may instruct the application to save its current state.

Returning to the illustrative example, because the telephone's memory 320 might be insufficient to run all four applications at once, the operating system 330 may choose to terminate the lowest ranked application (in this example, the document viewer) as it opens the calendar application because it has run out of memory. In an alternative implementation, the operating system 330 may predict a pending memory shortage and terminate one or more applications to prevent memory from running out. For example, if the amount of memory currently available drops below a predetermined threshold, the operating system may kill low ranking applications to bring the amount of currently available memory above the threshold. In an alternative implementation, the operating system 330 may compare upcoming memory requests by applications 310 with the amount of memory currently available; if the amount requested exceeds the amount currently available, the operating system may kill one or more applications.

In such a situation, the operating system 330 may identify the lowest ranked application or applications and terminate them temporarily. The operating system 330 may also set a flag as an indication of applications that may need to be re-launched automatically at a later time, e.g., when memory frees up, Selection of an application to kill may occur by other techniques. For instance, the operating system 330 may determine the amount of memory that is needed by a particular application and then identify other operating applications that can free up that amount of memory plus a certain safety zone of overhead memory. As one example, an application might require 3000K of extra memory and three other applications might each be capable of freeing up 2000K, 3000K, and 35000K of memory, respectively. The operating system 330 may determine that the least "damage" to memory, or the best use of available memory, may be accomplished by killing the first two programs because they most closely approximate the amount of memory that is needed. Alternatively, the operating system may be programmed to prefer killing as few applications as possible. In such a situation, the third application in the example would be killed.

Once the user has finished using the calendar application, the user may choose to return to the document viewing application. When the operating system 330 detects an attempt by the user to return to the document viewing application, which has been killed temporarily, the operating system 330 may recreate the application using the saved state information.

To do so, the operating system 330 may first sense a command to access the document viewing application, and may note from the stored flag that such application was active but has been killed temporarily. The operating system 330 may then launch the application and pass the saved state information to the application so that the application may be recreated in the form it was in, or substantially the form it was in, when it was temporarily killed. Alternatively, the application may have stored its own state information in cooperation with the operating system, and may itself access and implement such information.

Figure 4:
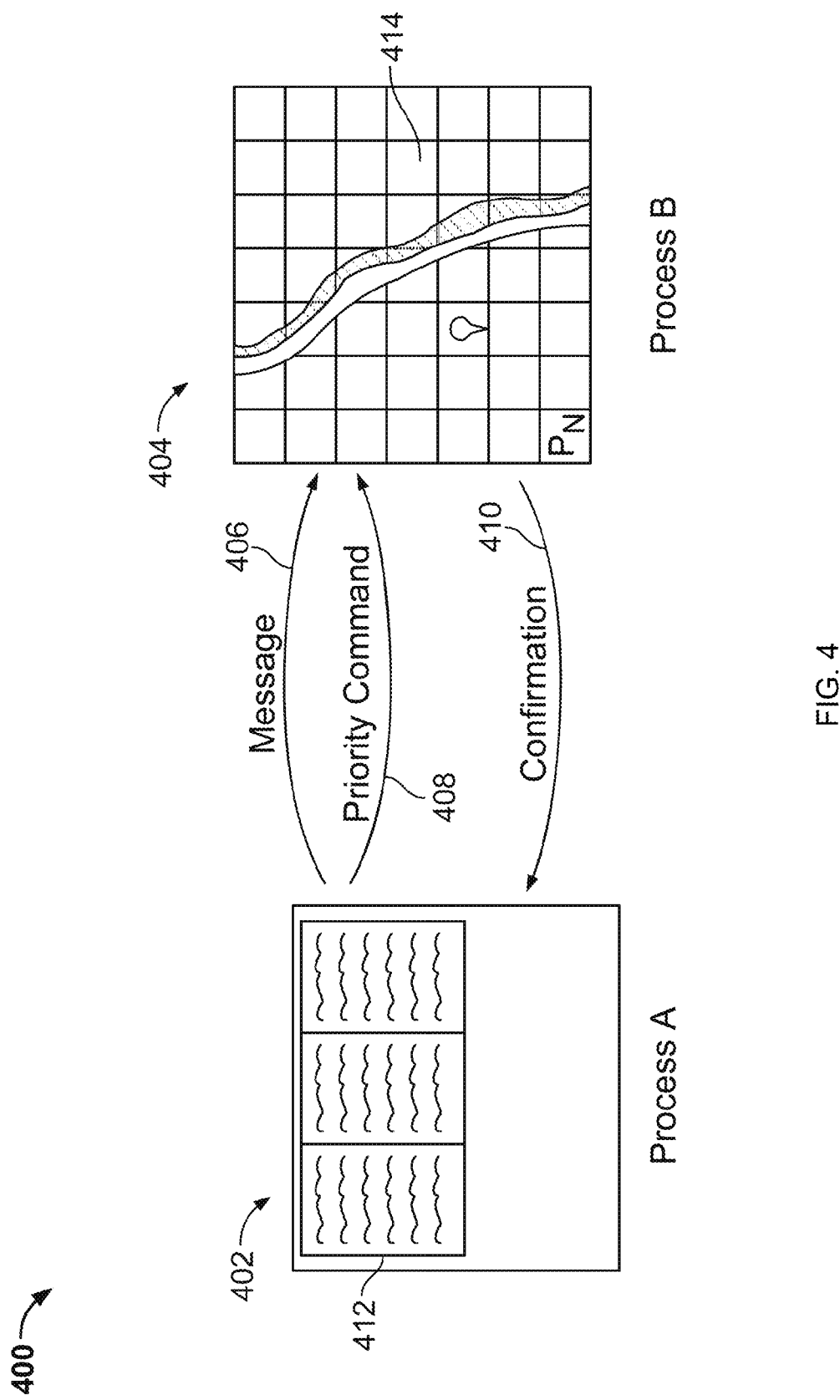
FIG. 4 is a conceptual diagram of a system that provides thread affinity with message passing between computer processes.

FIG. 4 is a conceptual diagram of a system that provides thread affinity with message passing between computer processes. In general, the system shows a pair of processes that are executing on a computing device and are communicating with each other to pass information between the processes. For example, one process may pass a message to the second process along with information on how the second process is to respond or react to the message, and the second process may provide a confirmation to the first process once it has responded or reacted to the message. Referring more specifically to FIG. 4, the system 400 includes a first process 402 and a second process 404. Both of the processes 402, 404 may be executing simultaneously or substantially simultaneously in a time-wise overlapping manner on a single computing device.

The first process 402 may be, for example, a document management program that displays one or more documents 412. The document management program may be, for example, a word processing application or a Web app that implements a word processing application in a Web browser. In certain instances, the Web browser may be part of an operating system, wherein the Web browser is the only native application for the operating system, and all other applications operate as Web apps inside the Web browser.

The second process 404, shows the execution of a mapping application 414. For example, a different Web app running in a system may access a server-based mapping service and may provide information in generally known manners for display of a geographical location using graphical tiles of a mapped geography. For example, a location of a user of a device that is executing the processes 402, 404 may be indicated on a map using a pin or other icons. The separate processes 402, 404 may also be represented on a device as separate tabs at a single Web browser, where the processes are sandboxed from one another, including by implementations that generally prevent communications between different domains from occurring within a Web browser.

A set of arrows passing between the processes 402, 404 indicates messages and information that may be communicated from one of the processes to another, and vice versa. For example, a message 406 may be initially sent from process 402 to process 404. For example, the message may indicate information that would cause a display for process 404 to change. In this example, for instance, the message 406 may include a latitude and longitude or address description that may be used to cause a different area of the map displayed in the mapping application 414 to be shown.

In addition, the process 402 may pass to process 404 information about the manner in which a command or commands that relate to the message 406 are to be carried out by the process 404. In this example, the information is in the form of a priority command 408. The priority command 408 may notify the process 404 regarding the priority that it should give to its execution relating to the message 406. For example, if process 402 is not a time-sensitive form of process, the priority command 408 may indicate that a response to message 406 is not to be treated as a high priority by process 404.

The message 406 and priority command 408 may be passed to process 404 separately or together, and directly or indirectly, depending on the particular circumstances. For example, when the message 406 and priority command 408 are passed together in a single larger message, the process 404 may parse the larger message to identify the message portion of the message, and the priority command that is embedded within the message. In other examples, additional information may be included with the message 406, and may be identified and processed as is appropriate for the manner in which the process 402 and the process 404 are programmed to operate and interoperate. Interoperability of the process 402 and the process 404 may be maintained by the two processes adhering to an application programming interface (API) or other similar standard for formatting communications between the processes.

In certain implementations, the process 404 may pass a message back to the processor 402. One such message is a confirmation 410 that indicates to the process 402 that the process 404 has fully acted on the message 406. In certain implementations, the confirmation 410 may occur simply by the process 404 providing information back to process 402 in response to receiving the message 406. In this particular example, such information may include an image of a mapped area determined by the application 404, that may be automatically integrated into the document 412 that is being managed by process 402.

In this manner, inter-process communication may be enhanced by allowing one process to communicate additional information to another process, including when the processes are part of separate windows or tabs that run in a sandboxed environment in a Web browser application. Such communication may allow a first process to control the manner in which another process executes certain code, including the priority to which the second process gives the execution of the code. As a result, tighter interoperability between processes may be provided while still maintaining high levels of security that prevent one of the processes from illicitly controlling or affecting one of the other processes.

Figure 5:
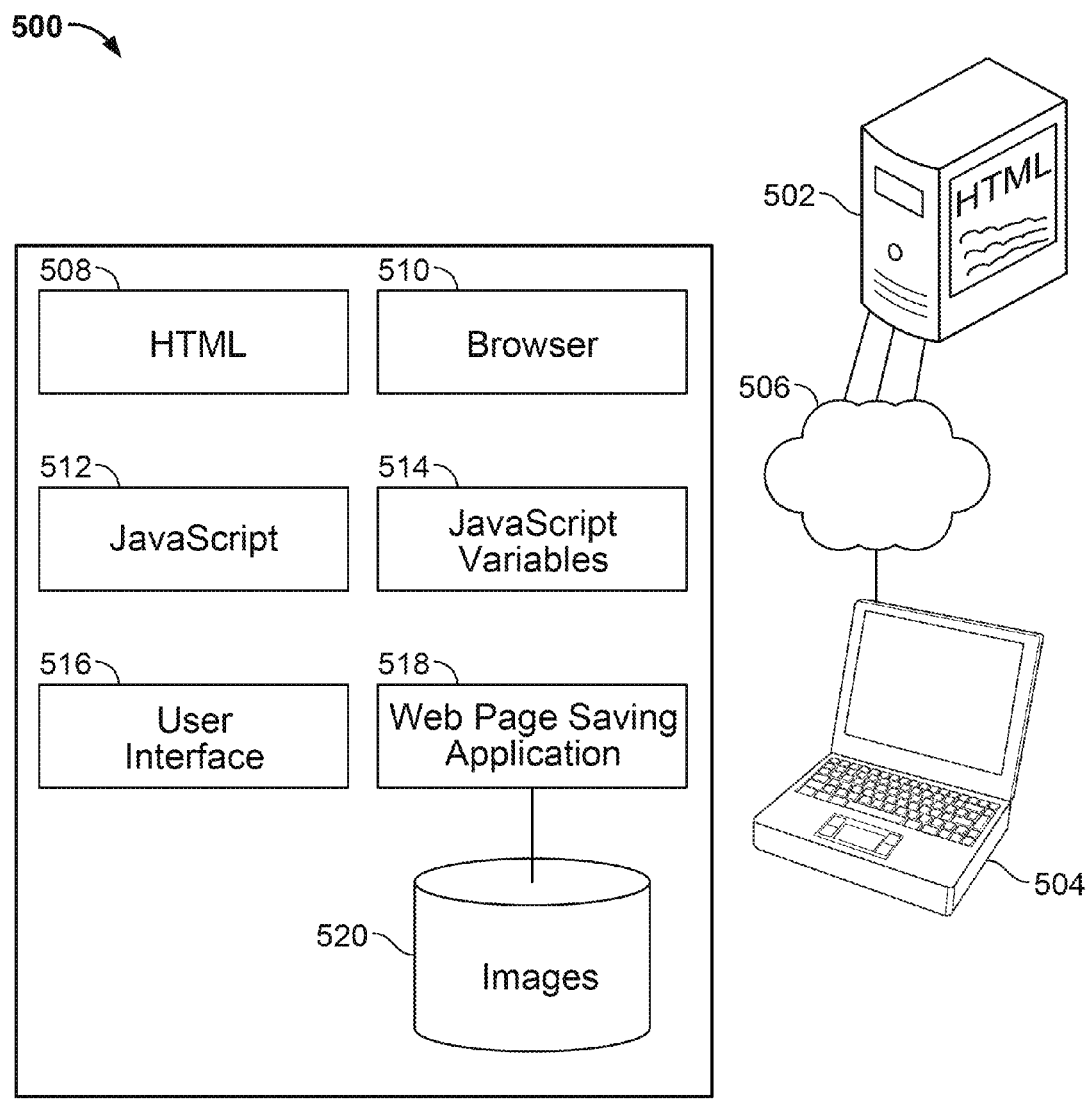
FIG. 5 is a conceptual diagram of a system that provides state information in a stateless environment.

FIG. 5 is a conceptual diagram of a system that provides state information in a stateless environment. In general, the system 500 uses a server system 502 to save up-to-date state information about the state of browser applications on various devices that are logged into server system 502 on behalf of a particular user of the server system 502. For example, where a browser is the only native application of an operating system on a device, such as computing device 504, the state information may be continually uploaded to, and updated in, the server system 502. In such a manner, if the user turns off computing device 504 or otherwise moves to another computing device and logs into the server system 502 from the other computing device, the state information for the browser application may be replicated to the application running on that other device, where that application may also run in an operating system in which the Web browser application is the only native application, and all other applications are web apps that run within the browser application. Also, if a user closes a session on one device and later starts up the same device, the techniques discussed here can re-establish the session using state data that is stored at a server system rather than on the device itself. As a result, the system may operate without requiring excess memory for storing such information on the device, and the state information may be more easily shared between devices.

The system 500 in this example includes a computing device 504 that communicates through a network 506, such as the Internet and related connected networks, with a server system 502. The server system 502 may be housed as part of a larger data center in a system that provides various Web services to users of the system 500. For example, the server system 502 may include one or more Web servers that may provide HTML code for generating documents for display on the computing device 504.

The computing device 504 includes a number of particular components that allow state information for the browser application, which would normally be a stateless application, to be stored so that a state of the computing device 504 may be replicated at a later time on the device 504 or on another device. For example, if the user puts device 504 into a sleep mode or turns off device 504, the most current state of the device 504 may have already been saved to server system 502 (e.g., when the user performed his or her last action with a web browser) or may be uploaded to server system 502 before the operating system allows the device 504 to go into a sleep mode fully. The state information may have been previously stored at the server system 502, for example, if the device 504 is programmed to upload an indicator of a change in state information every time there is a change in state information on the device 504. The state information may include document object models (DOMs) for pages currently displayed on the device in addition to other relevant information needed to recreate the state of the device.

Referring now to particular components that may be implemented in device 504, a browser application 510 is shown and may be an only application that executes natively on the device 504. Separately, HTML 508 may be stored on the device 504 so that it may be rendered by the browser application 510. The HTML 508 may take a variety of forms and may be represented in one or more examples as a document object model (DOM) tree. Also, the device 504 may store and implement JavaScript 512 and JavaScript variables 514. For example, when the HTML 508 is rendered, the HTML may include pointers or calls to various JavaScript programs that will run on the device 504. Those programs, when executing, may retrieve or generate variables or other information needed in the operation of the programs.

Also, a user interface 516 may be stored on the device and may represent various parameters, including a current representation of what is displayed on a visual display or screen of the device 504. For example, the user interface 516 may store information about what tabs of the browser are open at a particular time, and/or whether a different type of applications supported by the operating system such as a floating pane displayed over the top of the browser, as a particular state, and other appropriate information that may be used to describe the current state of the display on the device 504, and may be further used to reconstruct a display that matches the current displayed information on device 504.

A webpage saving application 518 may also be implemented on the device 504, and may track a current state of the browser 510 and other browsers, or other programs executing on the device 504. For example, the webpage saving application 518 may intercept calls to or from particular components on the device 504 to determine changes that have been made with respect to content represented by the browser 510 or to other information. The webpage saving application 518 may then cause a communication to be generated by device 504 and directed to server system 502 to indicates a change that has been made in a current state of the browser 510. For example, the device 504 may provide to the server system 502 information indicating that a browser tab has been opened, and also providing a URL for that tab.

The webpage saving application 518 and other components on the device 504, may also have access to a data store of images 520. In certain aspects, the images 520 are simply operating system level images, such as images for general icons and other basic information that is needed to run the device 504 and to recreate the state of the device 504. The images may also be images on webpages or images used by Web apps on the device 504, and may be stored on behalf of webpage saving application 518 for later access in or by the application 518.

Using the system 500 described here in one example, the current state of the user's device may be captured and uploaded to a server system 502. The user may then move to another computing device, such as by moving from a home computer to a network computer, and when the user has booted up the other device and perhaps provided credentials to identify themselves to the server system 502 (either manually or via a saved cookie on the other device), may have the full state of device 504 replicated at the work computer or other such device. As a result, the user may switch from one setting to another or may come back to a place they left more conveniently and may be able to use applications on the device 504 more efficiently. For example, if a user sets up applications or Web apps that are executing in the browser 510 on the user's behalf, the user may want keep those Web apps running at a later time or at another device. For example, a user may prefer to have an email Web app, a document editing app, a mapping app, and a general web browsing window open at all times, and the state replicating techniques can allow the user to do that without having to manually recreate the state whenever the user moves from one machine to another.

Figure 6:
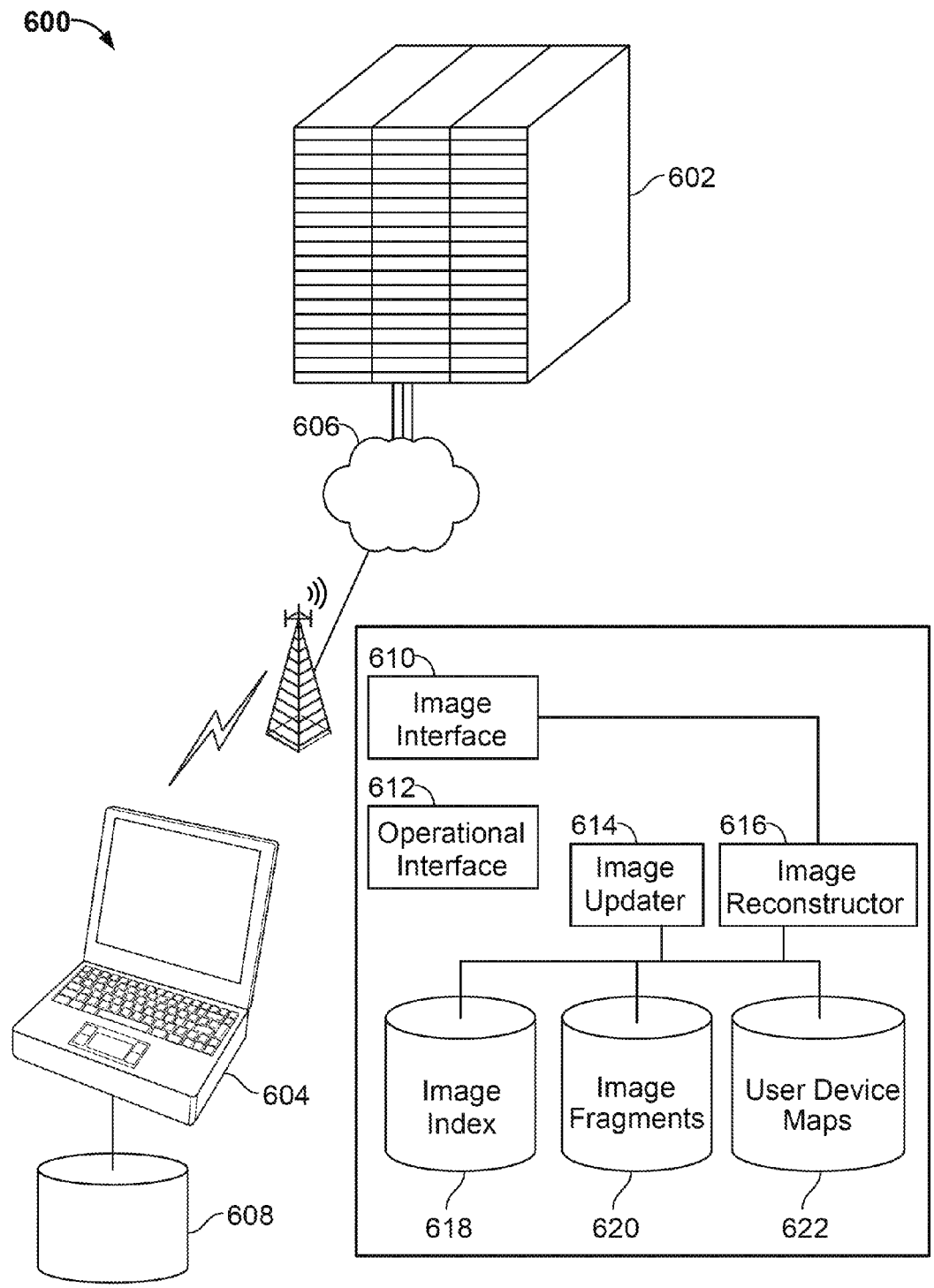
FIG. 6 is a conceptual diagram of a system that provides imaging for a computing device across a network.

FIG. 6 is a conceptual diagram of a system 600 that provides imaging for a computing device across a network (where an image here is a system image rather than a graphical image such as a photograph). In general, the system 600 includes a variety of devices such as mobile computing device 604 that may communicate through a network 606, such as the Internet, with a hosted server system 602. In addition to providing various hosted services, such as search engine services, mapping services, e-mail services, document management services, and the like, the hosted server system 602 may also cooperate with an operating system on the device 604 so as to manage the operating system on the device 604. For example, the operating system on the device 604 may be an operating system that has a single native application in the form of a Web browser, and other applications that execute on the device 604 may do so as Web apps in the Web browser. Such an approach may minimize the number of native applications that need to be stored on and managed by the device 604. In addition, as described here, such an arrangement may simplify the manner in which the device 604 may be managed by the host computer system 602.

In this example, the device 604 is shown as storing an image 608. The image may define what components are persistently stored on the device 604. For example, an image 608 may include basic operating system components beyond the firmwear on the device 604, in particular programs, where a single program may be part of the image of an operating system on the device that has a single native program in the form of a Web browser. Generally, images may be used to ensure that multiple computers have a common baseline of components in them so as to improve the ability to manage and maintain the operability of such computers. In particular, a company may want a certain number of software components available to its employees and other components not available, so it may define an image and may install that image on the employees' machines when they are first deployed.

Within this example, the server system 602 cooperates with the device 604 and other devices that receive services from the system 602 in order to maintain or repair images on the devices. As shown in the figure, a number of particular components may be employed by server 602 in providing such services. For example, an image interface 610 may be provided to interact with remote devices like device 604. The image interface 610 may, for example, communicate with the devices to verify that the image on each of the devices is still accurate. For example, where no applications are allowed to be added to a device, such as when the only native application is a browser in the additional applications are web applications that are not persistently stored, a hash may be made up from the native components on the device 604, and that hash may be stored and compared to a subsequent hash that is computed each time that the device 604 is booted. If the hashes do not match, that may indicate that the core components for the operating system on the device 604 have been compromised. In such a situation, the device 604 may send a message to the image interface 610, which may cause the interface 610 to in turn cause other components of the server system 602 to perform certain operations.

For example, an image re-constructor 616 may be programmed to identify, gather, and assemble particular components for an image, which may be a replacement image for device 604. The image re-constructor 616 may initially look to an image index 618 to identify the form of an image that is supposed to be installed on device 604. For example, a particular revision number for an operating system may be provided for the device 604. Alternatively, devices by different manufacturers or user bases may each have a custom image, though devices in a line provided by a single manufacturer may have a common image. Therefore, the image index 618 may be able to receive an identifier for a manufacturer and model of a device or of a company that operates the device, and to identify an image that is to be built in response to a request from such a device (where the image may be built from common interchangeable components stored by the system).

In this example, an image may be built up from image fragments. For example, certain levels of an operating system may be part of the image and each level in a modular operating system may be a separate fragment for the image. Also, different features in a common level may also be considered and stored as separate image fragments. The image re-constructor 616 or an image updater 614 may use information from the image index 618, which for example, may map an image identifier to the various fragments or components that make up the overall image.

Also, user device maps 622 may perform functions like those previously described for the image index 618, including by mapping particular users or user groups, or particular types of machines to particular images. For example, a user of a device may log into system 602, and be provided with one or more webpages on which the user can select particular components or fragments for the image they would like to have presented on their device 604. Those components may be saved in association with an identifier for the user, so that subsequent attempts to rebuild the image can automatically select those components that were previously selected by the user.

With an image reconstructed, the image updater 614, in cooperation with an operational interface 612 that may control general operations and coordination between the components discussed here, may supply an updated image through the image interface 610 and the network 606 to the device 604. The update may include an entire image for the device 604, such as when the device 604 has been wiped accidentally or purposefully through the network 606 by the server system 602.

In certain implementations, the server system 602 may be employed to remotely wipe an image from device 604 and in certain instances to replace the image with a new image. For example, if device 604 is stolen, the system 602 may wipe the image on device 604 and may use an identifier that may be incorporated into firmware on the device 604 to prevent the device 604 from obtaining an image again. Alternatively, the device 604 may be remotely wiped by the system 602 and may then be recovered by the proper owner, so that the server system 602 may then provide a new and updated image to the device 604 once the owner has verified that the device is back in the proper hands.

For example, when the device 604 is initially being booted up, a public key may be stored in a small read-only segment of the firmware, and the key may be used to check the kernel on the device 604. The key, or a different identifier, such as a hashed version or other hashed version (when the key itself is a hashed version) of one or more of the operating system components on the device may be checked against the components on the device at the time of booting, such as by running the components through the same hash function that created the original identifier. If a match is not made, that may indicate that the device 604 has been compromised (because the core code has changed when it should not have changed) and that someone has attempted to change native files on the device 600 for, such as to turn the device 604 into a bot or for other purposes.

A communication interface at a low-level of the operating stack may then make a network connection to the server system 602 before the user can interfere with the boot sequence, and may indicate that a failure in the image has occurred on the device 604. The server system 602 may then use the components discussed above to build a new image for the device 604 and transfer the new image to device 604. Device 604 may then replace the potentially corrupted image with the new image, and operate with the new image, including by completing the compromised image.

The device 604 may also pass the compromised image, or data that characterizes the compromised image, back to the server system 602. The server system 602 may then analyze the compromised image in an attempt to determine what caused the compromise. For example, the server system 602 may compare the compromised image to compromised images from other devices that were assigned the same initial image by the server system 602. If a number of matching compromised images are identified, such an identification may indicate that a coordinated attack has occurred by a single entity against the devices.

Thus, in the manners discussed here, a remote re-imaging system 600 may provide mechanisms for updating a device such as device 604 in a convenient manner. For example, because the device 604 does not persistently store much code, frequent updates to an image may provide minimal disruptions to a user of the device 604. Also, the use of cloud-posted image data, as discussed above, may provide a convenient manner for wiping particular client devices, and then reimaging them from the server system 602. In addition, the server system 602 may be able to store images for a large number of different user devices by simply using interchangeable components that together make up an entire image, and then mapping combinations of those components to particular devices in the user device maps database 622, so as to be able to reconstruct a particular image from a relatively unique combination of building blocks that are common across all devices or a particular large group of devices.

Figure 7:
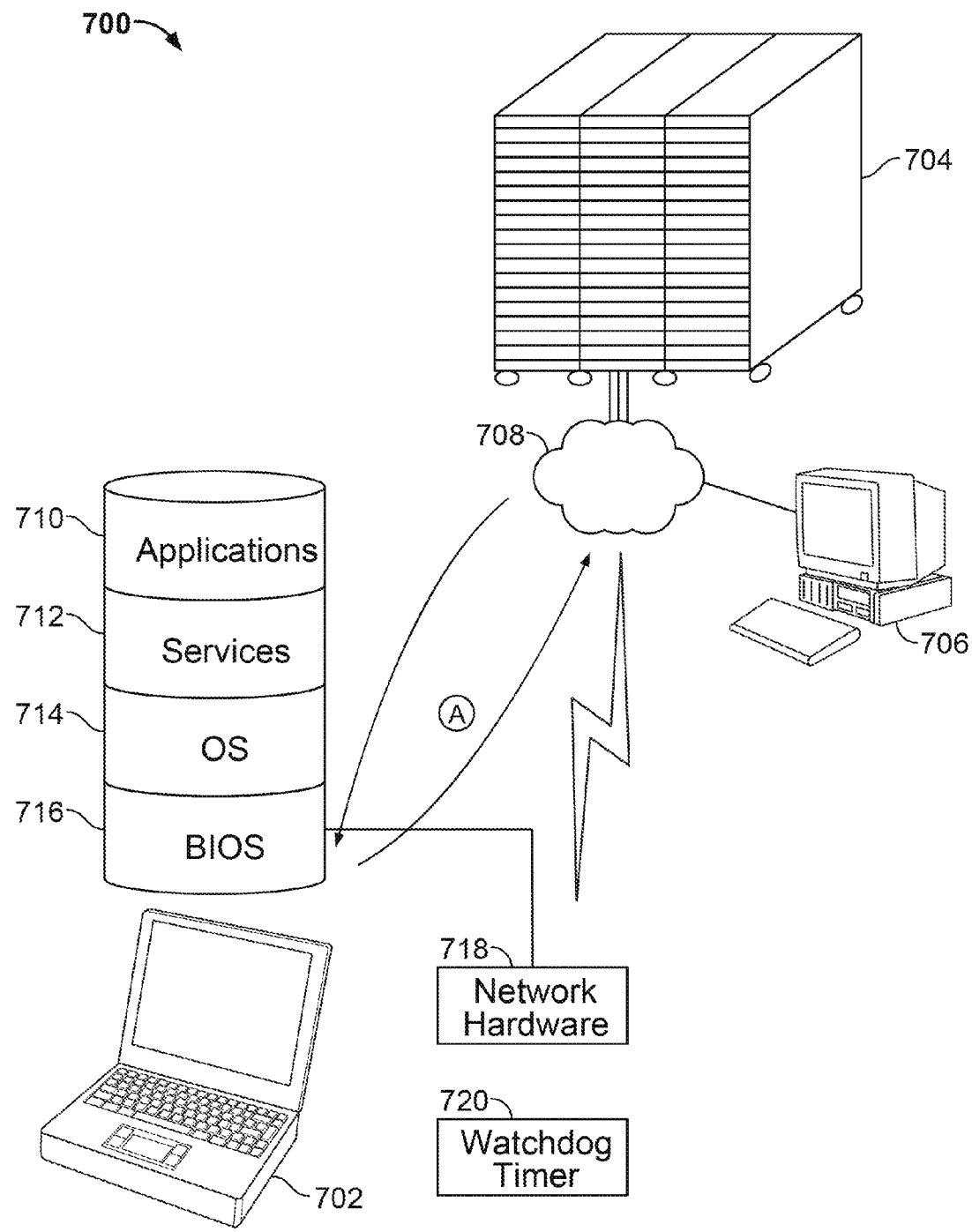
FIG. 7 is a conceptual diagram of a system that provides for remote monitoring and control of a computing device.

FIG. 7. is a conceptual diagram of a system 700 that provides for remote monitoring and control of a computing device. In general, the system 700 involves a computing device 702, which may be in the form of a portable computing device such as a smart phone or tablet computer or laptop computer. The computing device 702 may be a device that is loaded with a very light operating system, such as an operating system that has only one native application in the form of a Web browser, and wherein other applications are provided in the form of Web apps that run on the Web browser. As with other devices described above, the device 702 may interact through a network 708, such as the Internet, to communicate with a server system 704 in a desktop computer 706. The desktop computer 706 may be a computer that is owned by the same person as the computing device 702. For example, a user may have a desktop computer at work or home, and may use a portable computing device 702 on the road. The system 700 described here may be directed toward providing greater security in a computing device, by making it harder for fraudsters or similar people to interfere with the operating system for the device 702, and to provide a chance to check for malicious code or content.

One example mechanism for identifying security breaches at an early stage during the boot process is shown by the example stack in the figure. The stack in this example is relatively compressed, and includes at its lowest level a BIOS 716, which may be implemented in firmware. The BIOS may perform traditional operations for a BIOS, and may also include code for establishing a limited network connection with the server system 704. The limited connection in this example is used to report nefarious activity from the device 702 to the server system 704 (before the boot process has gotten to a level that can be hacked easily), or from the server system 704 to the device 702. As one example, a user may discover that the device 702 has been stolen, and may log on to the computer system 704 using computer 706. The user may then request that the device 702 be wiped, shutdown, or that it take a picture of the current user and report a current location of the device 702, or other appropriate action. When the device 702 is next booted, the BIOS 716 may notify server system 704 through a message sent by way of network hardware 718, which may include mechanisms for performing wireless communications. The server system 704 may respond back with a status message. Normally the status message may indicate that everything is okay. However since the user has logged in and reported the device 702 missing, the server system 704 in this example indicates to the device 702 that there has been a problem.

The server system 704, as shown by a return arrow between the network 708 and the device 702, may provide instructions for the subsequent operation of the device 702. For example, the server system 704 may instruct the device 702 to take a digital image of a user of the device 702, such as when the device 702 senses that someone is typing on the device 702. Device 702, having been fully booted up, may upload the picture automatically and without notifying the current user (presumably a thief). In addition, such image may be accompanied by GPS data that indicates a current location of the device 702. In this manner, law-enforcement authorities may know where to go to recover the device 702, and may also have proof that a particular user was using the device 702 while it was stolen.

The remainder of the stack for the booting of device 702 is also relatively compact. For example, after a basic security check has been made using the BIOS code 716, code for an operating system 714 may be executed and basic components of the operating system may be launched. As part of the operating system launch or as part of a similar but separate action, services 712 may then be opened and made available on the device 702, and applications 710, such as a dedicated native Web browser application for the operating system 714 may be launched.

Security checks may also be performed automatically and periodically, including after a full boot has occurred. For example, a watchdog timer 720 may run on the device 702, and may cause security on the device 702 to be checked periodically. For example, the stack shown here may be in its own system partition and when it is updated, may have a function applied to its code so as to create a hash value. When the watchdog timer 720 is triggered, a similar hash can be performed to whatever the stack contains at the time, if the operating system is one in which each of these components is always in the stack and does not change except during an update. The new hash may then be compared to the stored hash for the stack (Hashes may also be performed on fewer than all the components in the stack). If the value has changed, the server system 704 may be notified, and may subsequently send out a signal to the device 702 such as to lock down the device, to wipe storage on the device 702, to reformat a storage medium on the device, or to perform other such operations. The server system 704 may also notify the legitimate user of the device 702 by a back-up channel such as a work email or text message notification.

The device 702, in reporting problems to the server system 704, can report immediately upon discovering a problem or a later time. For example, the BIOS 716 may generate an identifier to indicate problems with the device 702. The BIOS 716 may then allow the other components of the stack to be executed so as to make the device 702 fully featured. Once the device 702 is fully booted up, the network hardware 718 may be caused to provide the identifier to the server system 704 so that the server system 704 knows and understands that the device 702 has problems, and so that the server system 704 may send to device 702 appropriate messages, such as messages to reboot, and reboot a particular process or processes, and erase a storage medium on the device 702, or to reformat a storage medium on the device 702.

Figure 8:
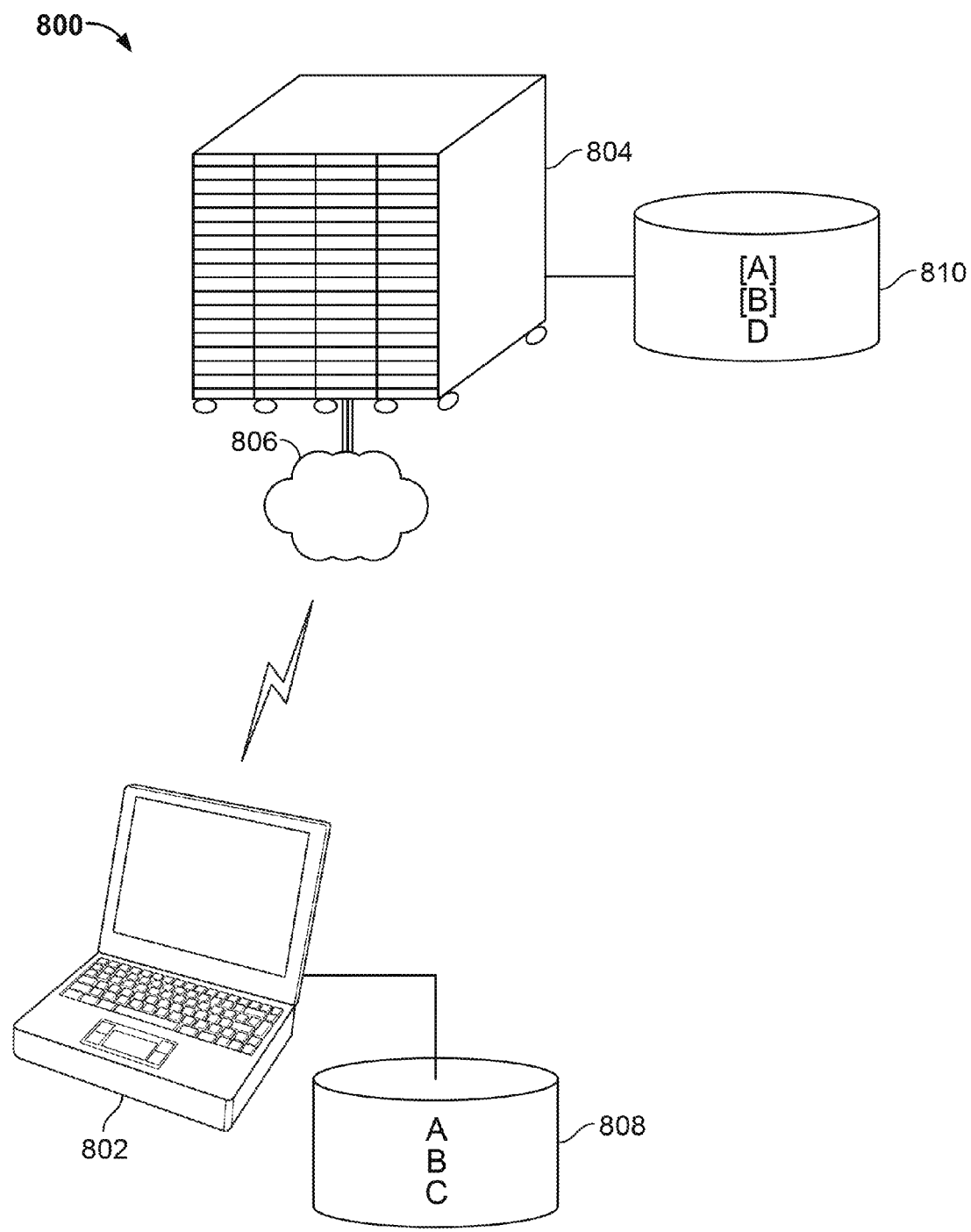
FIG. 8 is a conceptual diagram of a system for providing caching on a computing device of data that is stored centrally on a hosted computer system.

FIG. 8 is a conceptual diagram of a system for providing caching on a computing device of data that is stored centrally on a hosted computer system. In general, the system 800 uses storage 808 on a computing device 802, to serve as a cache for storage 810 on a server system 804. In such a manner, operation of the device 802 may be made more efficient and speedy by allowing cached data 808 to stay at the device 802 in many circumstances, and to require a round-trip over a network 806 in relatively fewer instances, so as to speed up processing. The device 802 here may be implemented like other devices discussed above, as having an operating system for which a Web browser is the only application, and other applications operate as Web apps of the Web browser. Also, the stack discussed for FIG. 7 may be implemented on the device 802.

In the figure, the device 802 is shown storing three particular values: A, B, and C. Similarly, server system 804 is storing two of those values in the form of A and B, in a corresponding manner. The server system 804 is also storing a value for D. The values for A and B in storage 810 are shown with brackets around them to indicate that those items are "dirty," and may not be trusted by other devices attempting to access the storage 810, because they may have been changed by device 802 in storage 808. Essentially, the server system 804 operates as if the device 802 has checked out those values—though if a request is made for them by another device, the server system 804 may inquire of the device 802 to get their latest values and get control of them back from device 802. Also, as shown in the figure, only item B has been changed at the device 802 from the version of the item that was obtained from the server system 804, as shown by an apostrophe on item B in storage 808.

While operating, device 802 may perform various operations that result in values for items A, B, and/or C, being changed. At an appropriate point in time, the device 802 may submit such changes to the server system 804, which may in turn update the values for the items in storage 810. The device 802 may also indicate that it is done using the items, and in response, server system 804 may unmark the items as being controlled types of values in the system 800. In this manner, data may be cached conveniently between a Web app running on device 802, and a data store for a server system 804.

Figure 9:
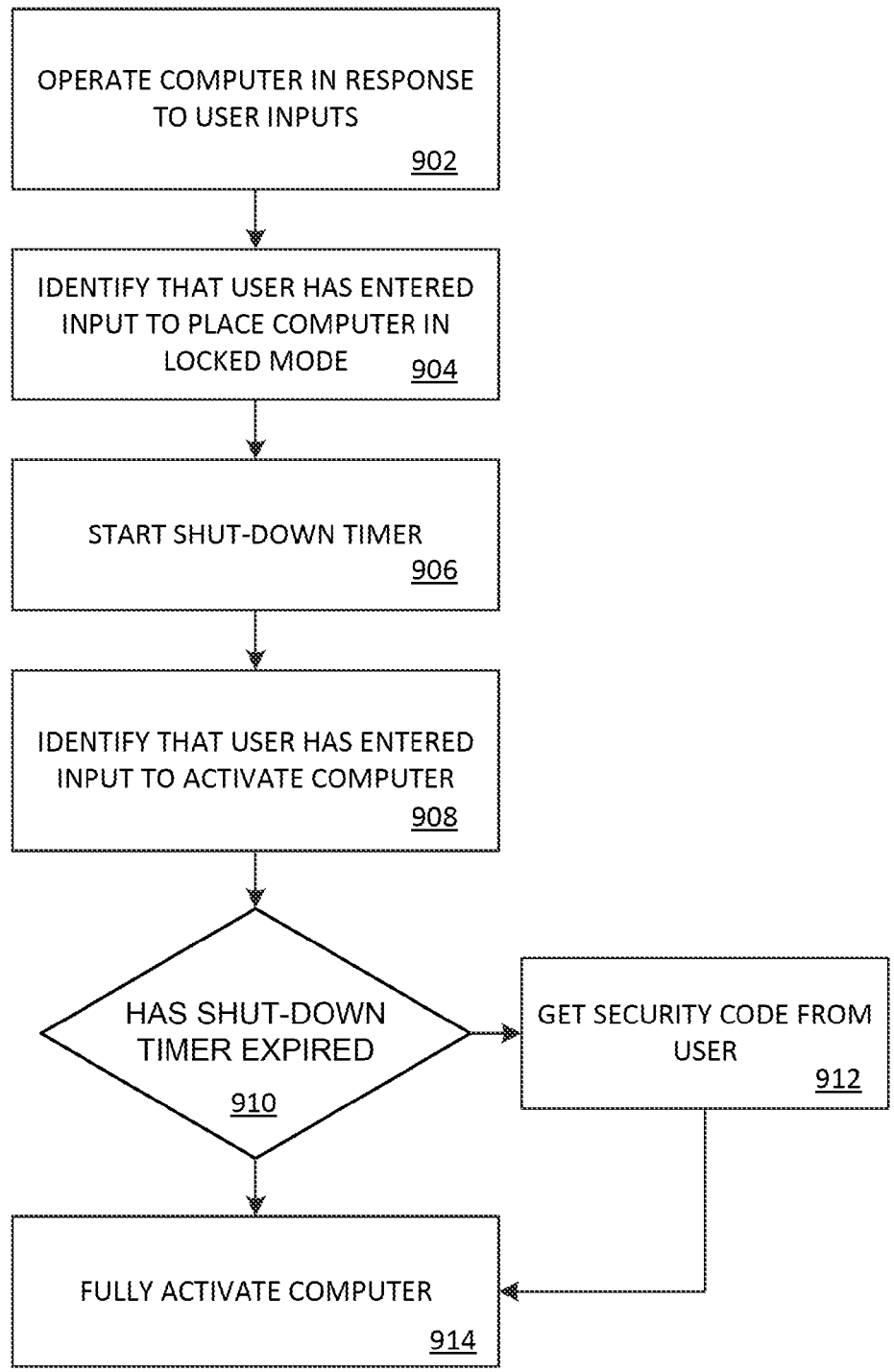
FIG. 9 is a flow chart of a process for providing delayed locking of a computing device.

FIG. 9 is a flow chart of a process for providing delayed locking of a computing device. In general, the process may execute on a computing device that is arranged to delay a passage from an active mode into a secured or locked mode, such as a sleep mode, when a user closes the device, such as by closing the cover of a clamshell device or by pressing a button or other component on a tablet device to put it into a secured sleep mode. In this example, a secured sleep mode is one in which a user has to enter a password or perform another similar operation to unlock the device in order to use it again. Generally, such a device is referred t oas Bing locked because it requires active input to reactivate, aside from simply turning the device back on.

The delay that is purposely introduced by the process described here may allow the user to get back into the device within a short time period after they indicate that they would like the device to go into a sleep or locked mode, in case the user quickly changes their mind and needs to use the device again before fully putting it into the sleep mode. Where the delay is appropriately timed and short, such a delay may introduce a minimal security burden to the process, in that the proper and original user is likely to stay near the device throughout the delay period, so that an interloper cannot take the device before it transitions to a locked mode.

The process begins at box 302, where it begins monitoring a computing device to determine whether a user has indicated that it should perform a particular action. At box 304, the process receives a user input regarding a locking time. For example, a user may configure their computing device so as to have a delay before changing the device into a sleep mode that can vary for particular users. For example, in this instance, a user may identify a delay of 9 seconds so as to provide an adequate time for the user to change his or her mind and reestablish an active state of the device. In response to the users' input regarding a delay time for locking the device, at box 506, the process adjusts a locking time parameter for the device. Such a parameter may be permanently stored on the device, so that from one session to another, the delay period for locking the device is the same, and the user can begin to feel comfortable that they will be able to reanimate the device quickly if the time has not expired.

At box 908, the process identifies that the device has been moved from the open configuration to a closed configuration, such as by the user closing a shell cover on the device to push a power switch on the device, or by the user directly pressing a switch to turn off the device or move it into a sleep mode. The relevant transition discussed here is a transition that requires substantial user input to return to an active operable mode for the device, such that it is more than simply moving the device from a closed to open configuration that might turn off the screen but be readily reversible, in that the device is not locked and substantial components have not powered down in response to the mode change. Nonetheless, to give the user feedback that their input has been received, a screen on the device may be blanked immediately after the device moves from open to closed configuration, even though a delay in moving the device to a sleep mode that requires substantial user input to recover from is ongoing.

At box 910, the process starts a shutdown timer that is tied to locking of the device at the expiration of the time parameter. The time parameter in this instance is the parameter that was selected by the user at box 904, and applied by the device at box 906. For example, the device may blank the screen and start a 9 second countdown timer as soon as it is closed, but may not move to a different mode until the timer has expired. Thus, at 912, the process repeatedly checks to determine whether the time that was set has expired. If it is not expired, the process checks, at box 914, whether the device has been opened. If the device has been opened, the process returns to monitoring the computing device at box 902. Subsequently, a user may set a new time in for the locking timer, or may again move the device from opened to a closed configuration, and thus repeat some or all of the actions discussed here.

Once the timer does expire, then the process locks the device at box 916. Such locking of the device may, in addition to requiring user unlocking input to bring the device back to an active state, also involve slowing particular processors on the device or removing the power to them entirely, turning off a display screen, turning off the air circulation fans and other items that draw electrical power, and waiting for the user to reactivate and unlock the device.

Figure 10A:
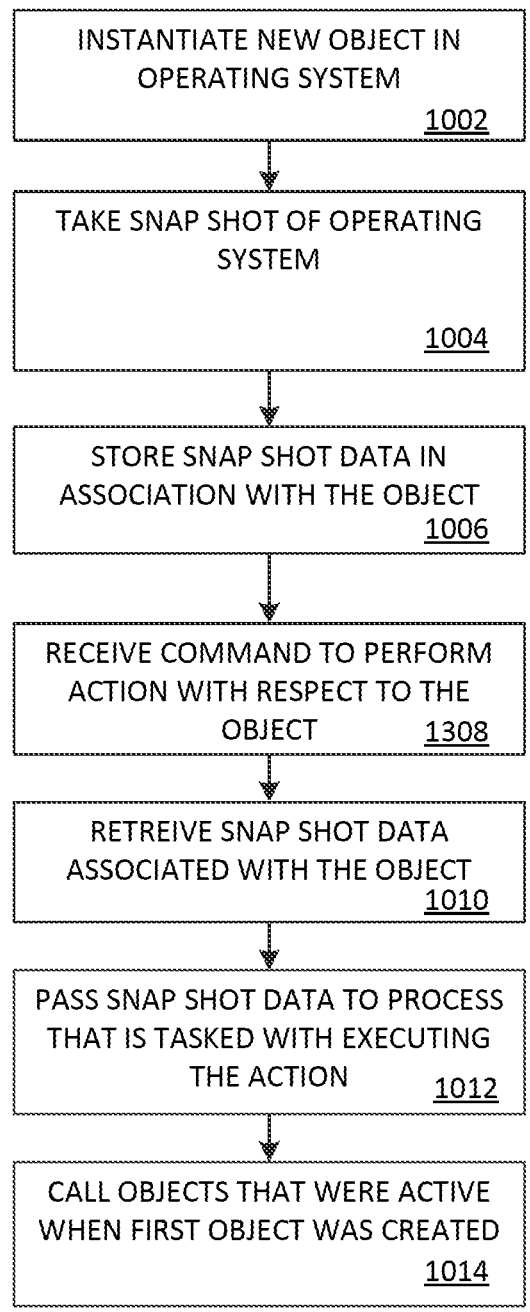
FIG. 10A is a flow chart of a process for managing contextual objects in an operating system.

FIG. 10A is a flow chart of a process for managing contextual objects in an operating system. In general, the process involves associating objects in an operating system with metadata that describes contexts around those objects when they were created and/or when they were changed or otherwise manipulated on a device.

The process begins at 1002, where the object is instantiated in an operating system. The object may take a variety of forms, and for illustrative purposes here, is a word processing document that may be edited in a word processing application. At box 1004, the process identifies contextual metadata that defines the state of other open objects at the time of the initiation. For example, a user may have a Web browser open to a particular URL, and the process may store an identifier for the Web browser and for the URL. Such contextual metadata may be relevant if it indicates that the user was viewing a webpage and then decided to take notes about the webpage in a word processing program. Thus, it may be beneficial to create and store a correlation between the webpage URL in a browser application, and the word processing document in a word processing application. And as a result, the contextual metadata is stored at box 1006, and the information regarding the instantiated object is stored at box 1008.

At box 1010, the object may be closed after a time, such as after a user types information into a word processing document and is finished editing the document, and subsequently a request may be received to open the object, such as when the user wants to edit the document some more. When the object is reopened, various other applications may be running at the time, and they may again be relevant to the reason that this document was opened by a user. Again, for example, browsers may be open to topics that are relevant to the user and, by extension, relevant to the document that is the object.

As a result, and to capture such information, at box 1012, the process updates contextual metadata with information about the open objects other than the instantiated object. Thus, the metadata repository for the object, which may be part of a domain file that represents the object itself, may be created, added to, and updated as the user continually opens, closes, and manipulates the object—where the data that is added to it represents the context on which the object existed in each circumstance, including as defined by other applications that were executing at the same time, and information about what those other applications were doing. Thus, at box 1014, the user goes through other cycles of closing and opening the object, and the metadata is updated.

Such contextual meta data may eventually be used, when it is determined to be sufficiently indicative of a user's intent, to perform automatic actions. For example, when the user opens a document, a system may simultaneously executed a search to a search engine in a browser and may display the search results with the document—if analysis of the contextual metadata indicates that the user typically performed the search upon opening the document (e.g., if the document tracks stock prices for a company, and the searches on the current price for the company so that he or she can cut-and-paste it into the document.)

Figure 10B:
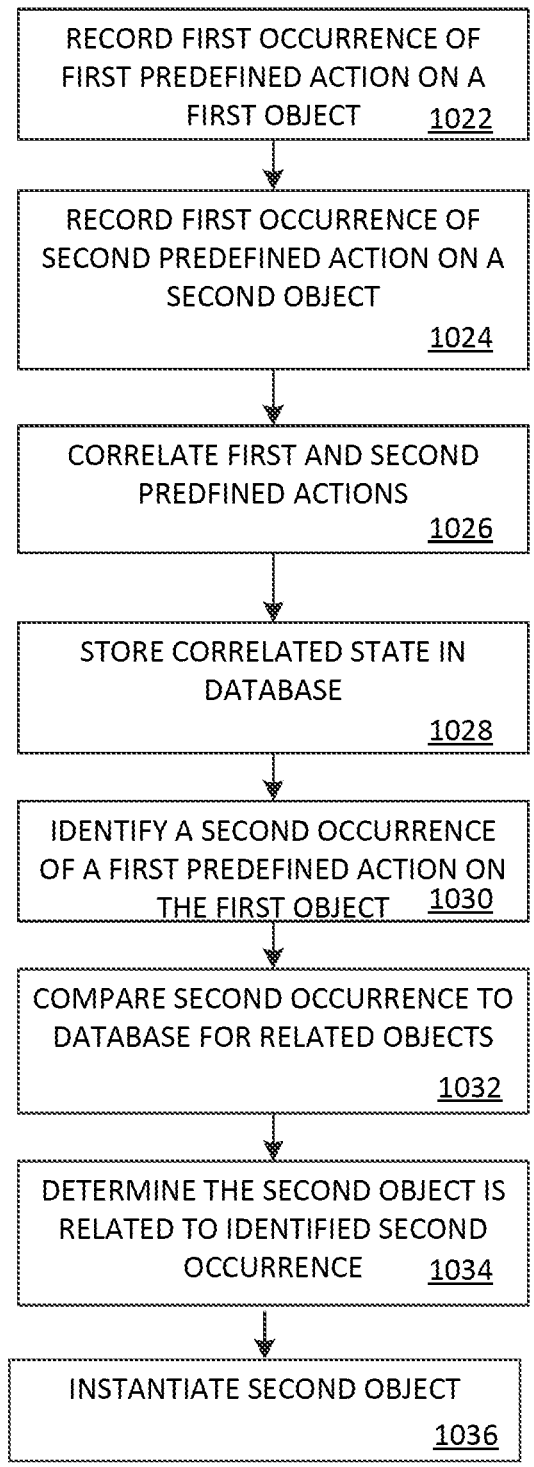
FIG. 10B is a flow chart of an alternative process for managing contextual objects in an operating system.

FIG. 10B is a flow chart of a process for managing contextual objects in an operating system. As with the process shown in FIG. 10A, the process involves associating objects in an operating system with metadata that describes contexts around those objects when they were created and/or when they were changed or otherwise manipulated on a device.

The process begins at 1022, where a first occurrence of a first predefined action on a first operating system object open on a computing device is recorded. At box 1024, a first occurrence of a second predefined action on a second operating system object open on the computing device at the same time as the first operating system object is recorded. The objects may take a variety of forms, such as a word processing document, an image file, a web browser displaying a particular URL, and the like.

Next, the first and second predefined actions relating to the first operating system object and the second operating system object, respectively, are correlated at box 1026. A correlated state comprising the correlated actions relating to the first and second operating system objects is stored at box 1028. A database is maintained that stores the correlated states. Storing these states provides a history of actions taking with respect to various objects at particular times, therefore, storing a history of object correlations. Doing so allows the computer to access a database to retrieve every correlated state involving a particular object so that relationships between various objects can be determined.

At box 1030, a second occurrence of the first predefined action on the first operating system object is identified. At box 1032, the second occurrence is then compared to correlated states in the database that include the first predefined action on the first operating system object. The comparison yields a determination that the second predefined action on the second operating system object is related to the first predefined action on the first operation system object, as shown at box 1034. Consequently, at box 1036, the second operating system object is instantiated. Correlations may be established by taking "snapshots" of the objects open on a computer at any given time. Correlations may also be determined by storing meta data relating to individual objects, wherein the meta state comprises information about other objects or users, as described above with respect to FIGS. 2A and 2B.

Figure 11:
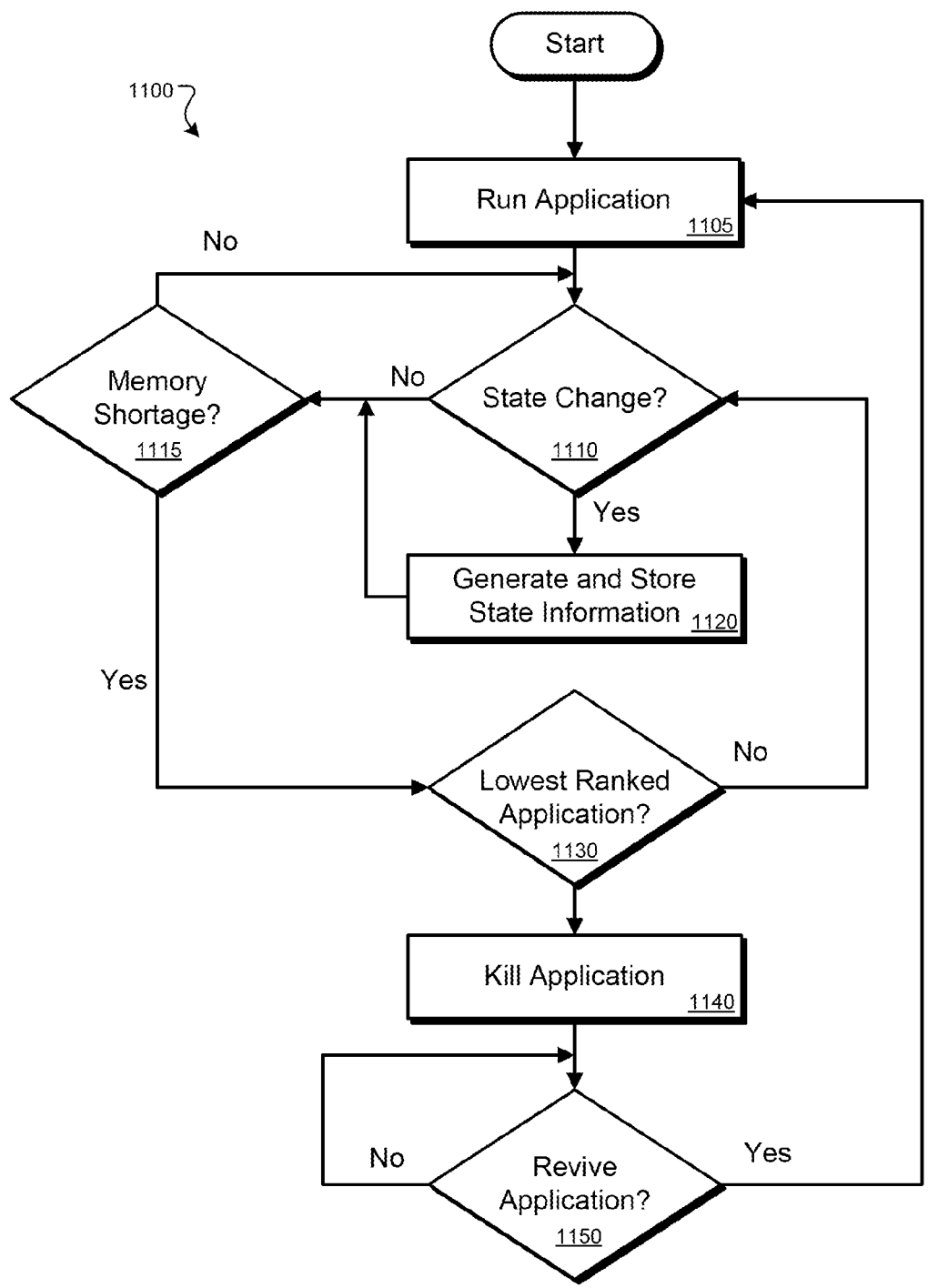
FIG. 11 is a flow chart of a process for maintaining memory control on a computing device.

FIG. 11 is a flow chart of a process for maintaining memory control on a computing device. The process 1100 may be performed, for example, by a system such as the system 400. However, another system, or combination of systems, may be used to perform the process 1100.

Referring to FIG. 11, a process 1100 illustrates the lifecycle of an application in the exemplary method for managing potential memory shortages on a computing device. The method begins at step 1105, where an application is executed. For example, the operating system may load an application from persistent memory in response to a user request or at the behest of another application. Next, at step 1110, the system 400 determines whether the state of the application has changed. In some implementations, the application monitor 220 can note when an application takes focus, when a new application has been created, or when application has been terminated. In an alternative embodiment, in addition to, or in lieu of, the changes mentioned above, an application manager may monitor user inputs to the system (e.g., key presses, mouse clicks, stylus or finger taps, etc.) to determine when an application may have changed state.

If a change of state is not detected, the method proceeds to step 1115, where the system determines whether a memory shortage exists. If the system determines that a memory shortage does exist, the method proceeds to step 1130 discussed below. If, however, a memory shortage does not exist, step 1110 is repeated.

Once a state change is detected, the method proceeds to step 1120. At step 1120, state information is generated and stored. Because applications in certain states may be killed at any time, after an application monitor detects a state change, the application monitor may instruct the application to generate and store state information in persistent memory. In an illustrative implementation, the state information may include information used to recreate the application as the application existed before it was terminated. For example, the state information may include, but is not limited to, the location of the application's window on the display, any changes to an application file made by the user, and the user's preferred view mode. Once the state information is generated, the application may store the state information to persistent memory.

After state information is generated and saved, the method proceeds to step 1115 where the system determines whether a memory shortage exists. If the system determines that memory has run out, the kernel may instruct the application terminator to make memory available by killing one or more applications. In an alternative implementation, the kernel may determine whether memory is becoming scarce. The kernel may detect an imminent memory shortage by comparing memory requests from the applications with the memory currently available. The kernel may also determine whether the amount of memory available is lower than a predetermined threshold value. When a shortage is detected, the kernel may take steps to free enough memory to ensure that selected applications will have sufficient memory to continue normal operation.

If the system has determined that memory is needed, the method advances to step 1130 where an application terminator determines if the application is the lowest ranked application, i.e., whether the application is at the bottom of the application hierarchy. If the application is not at the bottom of hierarchy 224, the method returns to step 1110 where the system monitors the application for a change of state. If the application is at the bottom of the hierarchy, the method proceeds to step 1140, where the application is killed. In some implementations, the application terminator determines whether the application is the last application in a program stack. If so, the application and any associated threads are killed.

At step 1150, they system determines if the application should be revived. In an illustrative implementation, if the system detects a user attempt to return to an application that was killed, the method returns to step 1105 where the application is revived using stored state information. For example, the system may detect attempts by the user to close or minimize windows overlaying the killed application. In response, the system 400 loads state information for the application from persistent memory and uses the stored information to revive the application.

If the system 400 does not detect an attempt to interact with the killed application, the method returns to step 1150 where the system 400 again determines whether to revive the application.

Figure 12:
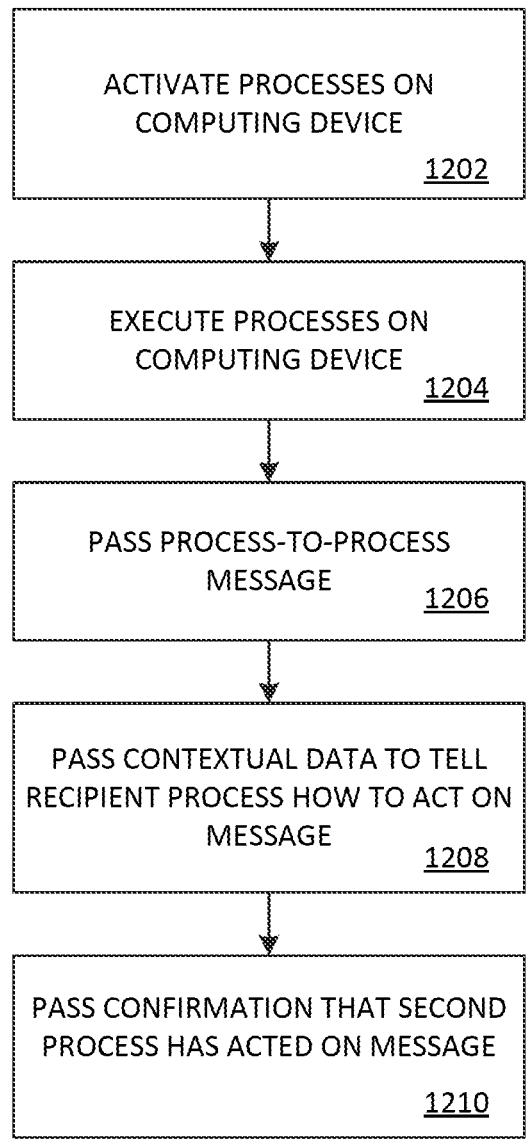
FIG. 12 is a flow chart of a process for providing thread affinity with message passing between computer processes.

FIG. 12 is a flow chart of a process for providing thread affinity with message passing between computer processes. In the in general the process is shown here as occurring between to processes that are executing on a single computer. For example, the two processes to him and may represent two different applications that are running on a device and are arranged to be Sam box from each other so as to protect memory on the device 41 versus the other application. The process begins at box is 1202 and 100 for, where each of the processes is instantiated.

At box 106, and after the processes have been running for a time, process eight may determine that it needs action by process be or needs to receive information back from process B. And as a result, at box 106, process eight passes a message with information defining how fast that process be needs to work on the message on the half of process a. Thus, at box Paul Blake, process be receives the message, and separate the main body of the message from the priority information at box 110. Process be then uses the priority information or other information that may be passed from process A. with the message to determine how to handle the message. For example, process a may need a report on the current state of a computer device in order to complete its work, and if waiting for information to do that will substantially slow and I'll let from process say that is needed immediately by the user, process may a provide information telling process be to prioritize its operations above all others. Thus, at box Paul hundred 12, process be may change its focus based on the priority information. For example, if process be was previously working through a long but not time sensitive process, it may state save state information for such activity and may put aside its work on process be intelligent has responded to process eight. In this manner, processes can communicate back and forth with each other in a convenient manner and so as to provide more focused responses for requests that are made through the processes.

Figure 13:
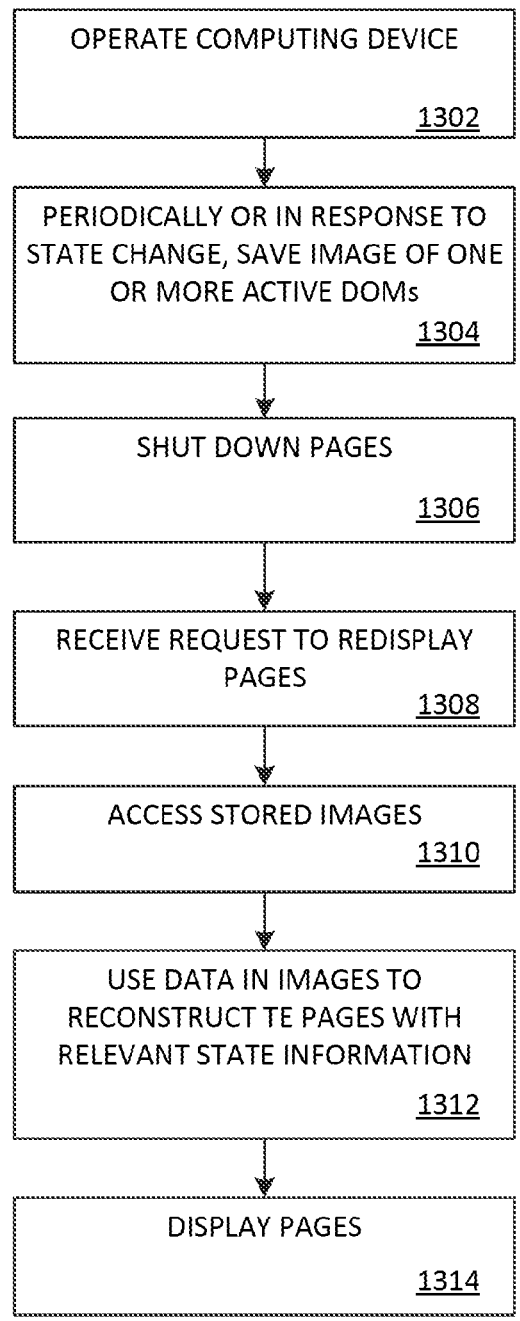
FIG. 13 is a flow chart of a process for providing state information in a stateless environment.

FIG. 13 is a flow chart of a process for providing state information in a stateless environment. In general, the process involves tracking changes in the state of an application such as panes of a web browser or one or more web apps running in a web browser, and passing information about those changes to a server system that stores such information. A later computer that is logged in for the same user may then obtain the state information from the server system and may recreate the last saved state accordingly.

The process begins at box 1302, where a user operates a computing device in a normal manner. The computing device may execute an operating system that runs a single native application in the form of a Web Browser, and other applications are run inside the Web browser, such as running as Web apps. Each pane in the browser and each of the Web apps may be sandboxed in its own isolated process for security purposes.

At box 1304, the process periodically or in response to a state change on the device, saves an image of one or more active DOMs on the device. Such activity may occur when the relevant state is the current status of a web page, such as whether a user has interacted with active content (e.g., JavaScript-created content) on a Web page. Other state information as an alternative to DOM information or in addition to the information may also be saved so as to fully capture the current state of the device, and of different processes in the device. For example, a list of each of the active processes on the device may be maintained and updated, and particular parameters that define the current state of those processes may also be updated. Such information may, at the same time or later, be uploaded to a server that is providing information to the computing device, and the server system may organize the information so that the last-saved state of the device can be reconstructed later.

At box 1308, a request for such a reconstruction occurs. For example, a boot process for a device that is registered via the server system with the same user as the first device may reach out to the server system automatically to obtain the most recent state information for the user account of the registered device. The server system may then access stored images for the particular device (where a user or group of users may define an image for their devices that the devices are to take on automatically when they are booted). Also, the device may use data that is associated with components of the image to reconstruct Web pages and other objects to the state they were in when the user last used a computer that was registered to the user's account with the server system, whether the earlier computer and later computer were the same or different from each other.

At box 1314, the process displays the pages and other objects with their prior saved states intact.

Figure 14:
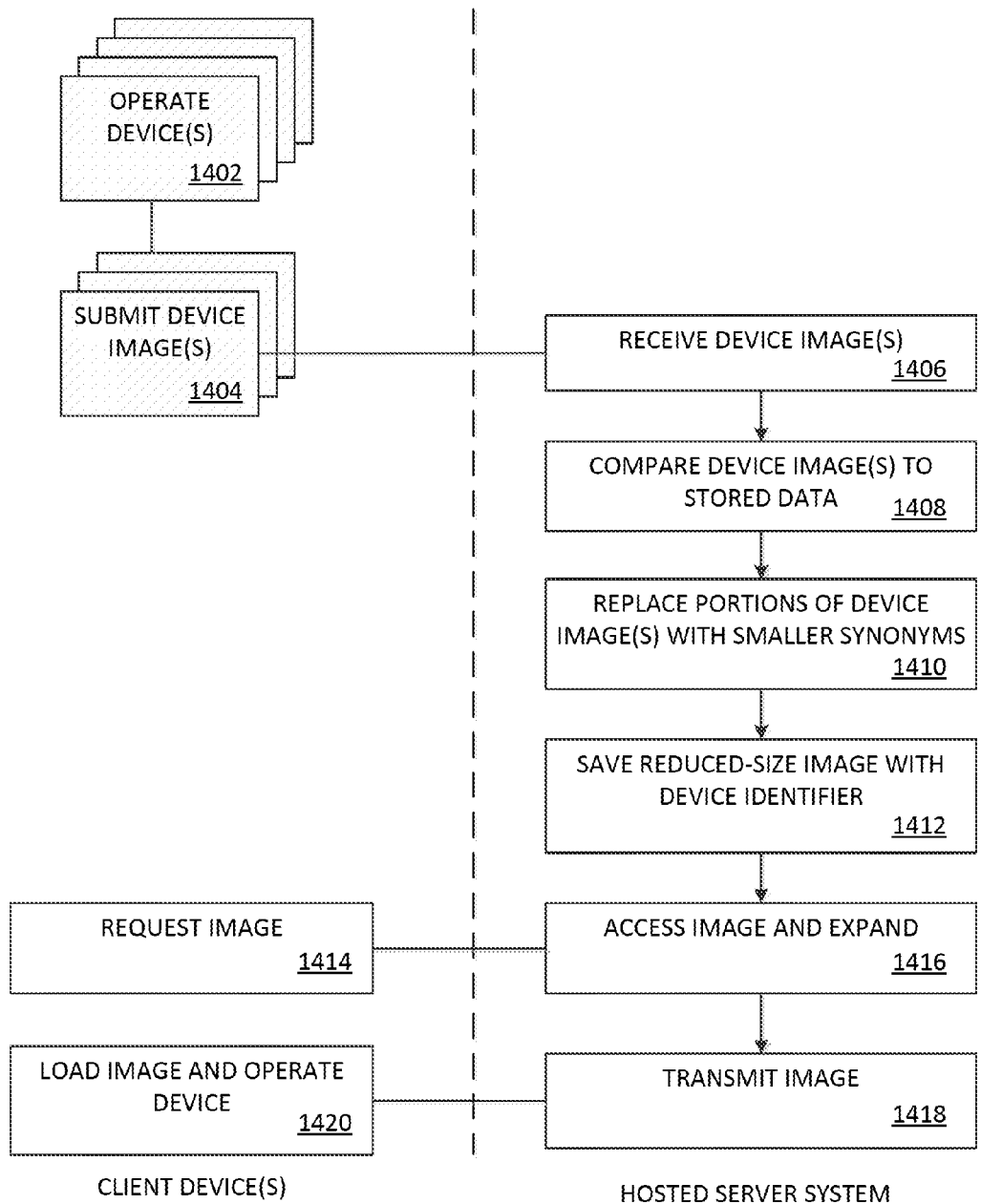
FIG. 14 is a flow chart of a process that provides imaging for a computing device across a network.

FIG. 14 is a flow chart of a process that provides imaging for a computing device across a network. The in general, the process is shown here as occurring on one or more client devices that communicate with a hosted server system. The particular division of work shown in this example is provided for illustrative purposes only and other actions may be taken by similar components or by different components in different implementations. The process shown here generally involves storing image data for constructing images that each define how a client device will operate when it is booted. The images are stored and constructed at a central hosted server system, and image data is provided to the client devices at boot time.

The process begins at box 1402 where multiple different client devices are operated in ordinary manners by users of the devices. Each of the users may establish parameters for an image on their particular device, such as at box 1404, and may submit the device images to the hosted server system which may receive the images at box 1406. For example, the user may want particular applications (such as Web apps) to be loaded when they boot their device, and may want settings on the device set in a particular manner.

At box 1408, the server system compares images for particular devices to stored data at the server system. For example, the server system may store components that together make up various different images, and may simply store one copy of each component, and a basic textual or similar file that maps the components to each of the images for the client devices. For example, a binary list of digits may be used to identify an overall image, were each position in the list may identify a particular component that may or may not be present in a particular image, and where the presence of a one in that position for a particular device may indicate to the server system that the device has the particular component in its image. Thus, for example, at box 1410, the process replaces portions of the device images with smaller synonyms. In the example just described, the synonyms may be simple bit values, whereas in other implementations, the synonyms may be alphanumeric identifiers that are unique for particular components in the system.

At box 1412, the server system saves a reduced size image with a device identifier that points to the device that belongs to the particular image. For example, the system may store code for particular components at one location, and may store a device identifier that is unique for a device along with the binary stream discussed above and in other location.

At a later date, a particular device may request an image, as indicated by box 1414, and the server system may access the image for that device and expand it, at box 1416. As one example, a device may request an image every time it is booted, and may not store its image locally when it is off. Such expansion may involve stepping through a binary list like that discussed above with the server system, and gathering components where each value in the list is a one rather than a zero. Other techniques for gathering components or otherwise building an image for a device may also be used.

At box 1418, the server system transmits the image that it has built back to the client device, at box 1420 the client device loads the image and allows the device to be operated fully by a user of the device. And using the techniques discussed here, image data may be stored a hosted system in a manner in which its size is reduced across the system, particularly when a large number of devices operate with respect to the system.

Figure 15:
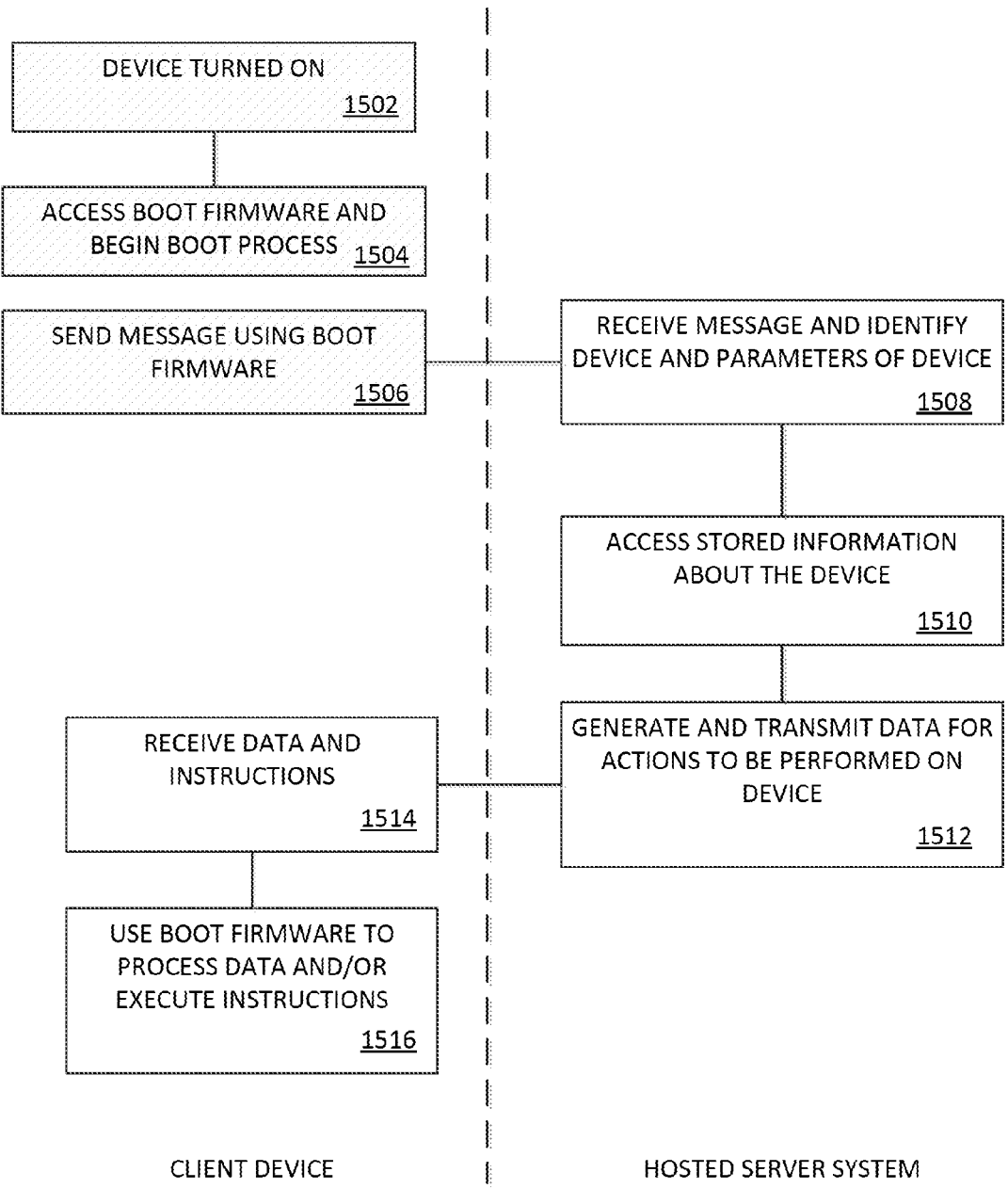
FIG. 15 is a flow chart of a process for providing remote monitoring and control of a computing device.

FIG. 15 is a flow chart of a process for providing remote monitoring and control of a computing device. In general, the process provides security for a client computing device by conducting security checks at a low-level in an operating system stack so as to reduce the ability of hackers to get into the stack in a level below a level at which the checks are occurring.

The process begins at box 1502, where a device is turned on by a user. At box 1504, the device accesses its boot firmware and begins the boot process in a familiar manner. The firmware may be part of a bios or other structure on the device. The firmware may also include mechanisms for wireless transmission between the device and the hosted server system, and at box 1506 the process uses such functionality to send a message to the hosted server system. The message may be treated as a request to identify a change in circumstances of the device since the last time the device checked in with the hosted server system. At box 1508, the server system receives the message and identifies the device and parameters of the device. For example, the hosted server system may use a device identifier to determine whether any events relevant to the device have occurred, such as the user of the device reporting that the device has been stolen and should be locked out or wipe or reformat it. In addition, the identity of the device may be used, as discussed with respect to FIG. 14, to identify an image for the device and begin gathering components for providing the image back to the device for further booting of the device.

At box 1510, the server system accesses stored information about the device such as that discussed immediately above with respect to reports by a user of the device and whether the device has been stolen. At box 1512, the server system generates and transmits data for actions to be performed on the device. As discussed with FIG. 14, such actions may include providing an image for the device that is to be executed in booting by the device. Such actions may also relate to security to be implemented with respect to the device. For example, if the message that was sent by the boot firmware indicates that that part of a stack on the device has been changed since the most recent update, the actions to be performed on the device may include wiping the device or reformatting a storage structure such as flash memory or a hard drive on the device. Similar actions may be performed in response to an external indication from a user of the device that the device has been stolen. Thus, actions on the device may be responsive to information received at boot time from the device, or responsive to other information that is not received from the device, but that is received from an external source such as a user calling in a report.

At box 1514, the client device receives the data and instructions, and at box 1516, the client device uses the boot firmware to process the data that has been received and/or to execute instructions that have been received. Other types of instructions that may be received include instructions to report back information about the device so that the device can be recovered. For example, the device may take a digital photo using an onboard camera in an attempt to capture an image of a thief who is using the device, and may transmit back the photo along with GPS data that indicates a location of the device, as discussed above.

Figure 16:
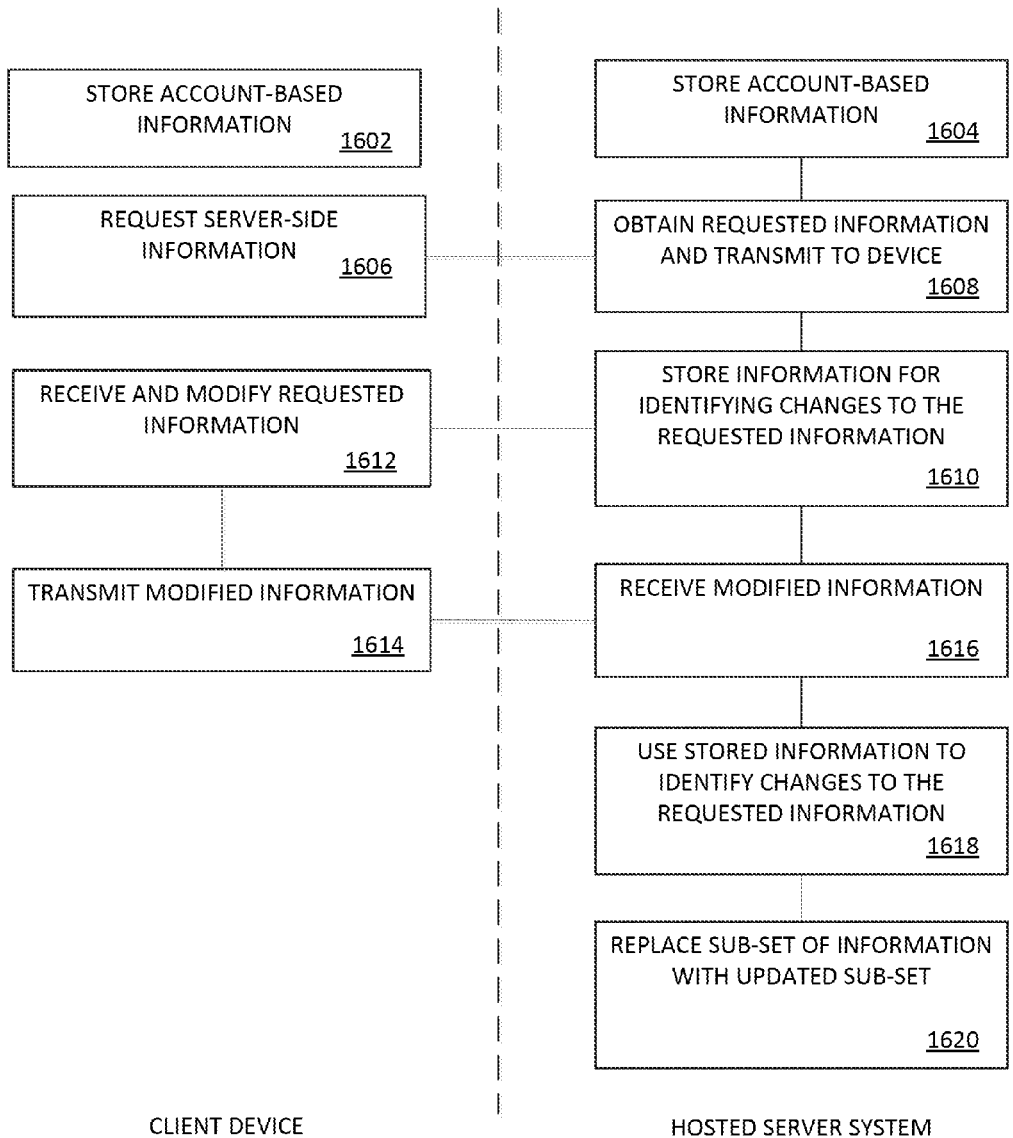
FIG. 16 is a flow chart of a process for providing caching on a computing device of data that is stored centrally on a hosted computer system.

FIG. 16 is a flow chart of a process for providing caching on a computing device of data that is stored centrally on a hosted computer system. In general, the process indicates how certain data for a web-based computing device may generally be stored at a hosted server system, but may also be cached down onto a client device that communicates with the hosted server system and depends on a hosted server system for operating applications on the device including Web apps in a Web browser.

The process begins at box is 1602 and 1604, where both the client device and the hosted server device store account-based information for the device. For example, each device or system may store a user ID for a device that correlates the device to a particular user account with the hosted server system. At box 1606, the client device requests server-side information, and at box 1608 the hosted server system obtains the requested information and transmits it to the client device. The hosted server system may also store information for identifying changes that will be made to the request information in the future. In certain implementations, the hosted server system may assume that any information that is provided to the client device for editing will be edited, so that the hosted server system may mark or at least provisionally mark such data as being dirty when it is passed to the client device. At box 1612, the client device receives the requested information and in response to user interaction with the client device, it may modify the requested information. At an appropriate time, the modified information is transmitted back from the client device to the hosted server system. Such an appropriate time may be determined by a clock that periodically provides information back to the server system, or by a particular event, such as a user selecting a defined control in an application.

At box 1616, the server system receives the modified information, and at box 1618, it uses stored information to identify changes to the requested information. For example, the system may compare the information that is received back from the client device to the information that was previously marked dirty to determine whether any relevant changes have been made to the information that was given to the client device. At box 1620, the server system may replace a subset of the information with the updated subset. Thus, for example, where the system determines that there is not a match between the dirty data on the system and the data received back from the client device, the server system may insert the changed information from the client device.

Figure 17:
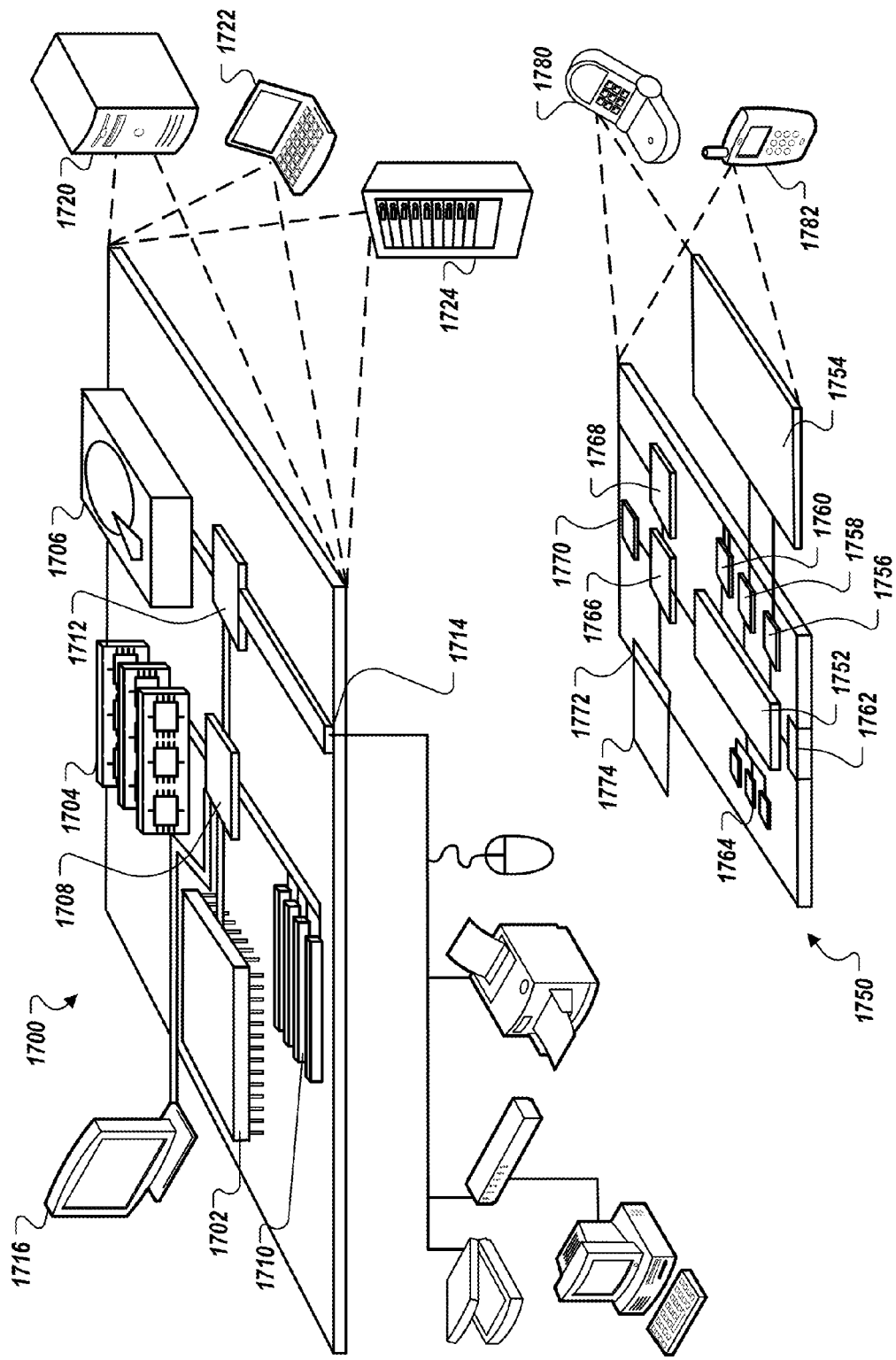
FIG. 17 shows an example of a computer device and a mobile computer device that can be used to implement the techniques described here.

FIG. 17 shows an example of a generic computer device 1700 and a generic mobile computer device 1750, which may be used with the techniques described here. Computing device 1700 is intended to represent various forms of digital computers, such as laptops, desktops, workstations, personal digital assistants, servers, blade servers, mainframes, and other appropriate computers. Computing device 1750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1700 includes a processor 1702, memory 1704, a storage device 1706, a high-speed interface 1708 connecting to memory 1704 and high-speed expansion ports 1710, and a low speed interface 1712 connecting to low speed bus 1714 and storage device 1706. Each of the components 1702, 1704, 1706, 1708, 1710, and 1712, are interconnected using various busses, and may be mounted on a common motherboard or in other manners as appropriate. The processor 1702 can process instructions for execution within the computing device 1700, including instructions stored in the memory 1704 or on the storage device 1706 to display graphical information for a GUI on an external input/output device, such as display 1716 coupled to high speed interface 1708. In other implementations, multiple processors and/or multiple buses may be used, as appropriate, along with multiple memories and types of memory. Also, multiple computing devices 1700 may be connected, with each device providing portions of the necessary operations (e.g., as a server bank, a group of blade servers, or a multi-processor system).

The memory 1704 stores information within the computing device 1700. In one implementation, the memory 1704 is a volatile memory unit or units. In another implementation, the memory 1704 is a non-volatile memory unit or units. The memory 1704 may also be another form of computer-readable medium, such as a magnetic or optical disk.

The storage device 1706 is capable of providing mass storage for the computing device 1700. In one implementation, the storage device 1706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1704, the storage device 1706, memory on processor 1702, or a propagated signal.

The high speed controller 1708 manages bandwidth-intensive operations for the computing device 1700, while the low speed controller 1712 manages lower bandwidth-intensive operations. Such allocation of functions is exemplary only. In one implementation, the high-speed controller 1708 is coupled to memory 1704, display 1716 (e.g., through a graphics processor or accelerator), and to high-speed expansion ports 1710, which may accept various expansion cards (not shown). In the implementation, low-speed controller 1712 is coupled to storage device 1706 and low-speed expansion port 1714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1700 may be implemented in a number of different forms, as shown in the figure. For example, it may be implemented as a standard server 1720, or multiple times in a group of such servers. It may also be implemented as part of a rack server system 1724. In addition, it may be implemented in a personal computer such as a laptop computer 1722. Alternatively, components from computing device 1700 may be combined with other components in a mobile device (not shown), such as device 1750. Each of such devices may contain one or more of computing device 1700, 1750, and an entire system may be made up of multiple computing devices 1700, 1750 communicating with each other.

Computing device 1750 includes a processor 1752, memory 1764, an input/output device such as a display 1754, a communication interface 1766, and a transceiver 1768, among other components. The device 1750 may also be provided with a storage device, such as a microdrive or other device, to provide additional storage. Each of the components 1750, 1752, 1764, 1754, 1766, and 1768, are interconnected using various buses, and several of the components may be mounted on a common motherboard or in other manners as appropriate.

The processor 1752 can execute instructions within the computing device 1750, including instructions stored in the memory 1764. The processor may be implemented as a chipset of chips that include separate and multiple analog and digital processors. The processor may provide, for example, for coordination of the other components of the device 1750, such as control of user interfaces, applications run by device 1750, and wireless communication by device 1750.

Processor 1752 may communicate with a user through control interface 1758 and display interface 1756 coupled to a display 1754. The display 1754 may be, for example, a TFT LCD (Thin-Film-Transistor Liquid Crystal Display) or an OLED (Organic Light Emitting Diode) display, or other appropriate display technology. The display interface 1756 may comprise appropriate circuitry for driving the display 1754 to present graphical and other information to a user. The control interface 1758 may receive commands from a user and convert them for submission to the processor 1752. In addition, an external interface 1762 may be provide in communication with processor 1752, so as to enable near area communication of device 1750 with other devices. External interface 1762 may provide, for example, for wired communication in some implementations, or for wireless communication in other implementations, and multiple interfaces may also be used.

The memory 1764 stores information within the computing device 1750. The memory 1764 can be implemented as one or more of a computer-readable medium or media, a volatile memory unit or units, or a non-volatile memory unit or units. Expansion memory 1774 may also be provided and connected to device 1750 through expansion interface 1772, which may include, for example, a SIMM (Single In Line Memory Module) card interface. Such expansion memory 1774 may provide extra storage space for device 1750, or may also store applications or other information for device 1750. Specifically, expansion memory 1774 may include instructions to carry out or supplement the processes described above, and may include secure information also. Thus, for example, expansion memory 1774 may be provide as a security module for device 1750, and may be programmed with instructions that permit secure use of device 1750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1764, expansion memory 1774, memory on processor 1752, or a propagated signal that may be received, for example, over transceiver 1768 or external interface 1762.

Device 1750 may communicate wirelessly through communication interface 1766, which may include digital signal processing circuitry where necessary. Communication interface 1766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1768. In addition, short-range communication may occur, such as using a Bluetooth, WiFi, or other such transceiver (not shown). In addition, GPS (Global Positioning System) receiver module 1770 may provide additional navigation- and location-related wireless data to device 1750, which may be used as appropriate by applications running on device 1750.

Device 1750 may also communicate audibly using audio codec 1760, which may receive spoken information from a user and convert it to usable digital information. Audio codec 1760 may likewise generate audible sound for a user, such as through a speaker, e.g., in a handset of device 1750. Such sound may include sound from voice telephone calls, may include recorded sound (e.g., voice messages, music files, etc.) and may also include sound generated by applications operating on device 1750.

The computing device 1750 may be implemented in a number of different forms, as shown in the figure. For example, it may be implemented as a cellular telephone 1780. It may also be implemented as part of a smartphone 1782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   instantiating, at a first time, an operating system object on a computing device;
   automatically identifying user interactions with one or more other objects that are open on the computing device, other than the instantiated operating system object, when the operating system object is instantiated; and
   storing the identified user interactions in correlation with the operating system object,
   wherein the identified user interactions identify the one or more other objects that are active in the operating system when the operating system object is instantiated.

2. The method of claim 1, wherein the identified user interactions are stored with contextual meta data that defines a state of the objects that are open on the computing device.

3. The method of claim 1, further comprising:
   determining behavioral trends from the identified user interactions; and
   determining personal preferences from behavioral trends.

4. The method of claim 1, further comprising, at a later time, in response to the operating system object being instantiated, automatically instantiating at least one of the other objects.

5. The method of claim 1, wherein storing the identified user interactions includes associating the user interactions with a particular user.

6. The method of claim 5, further comprising:
   at a later time, identifying a user input from the particular user causing the operating system object on the computing device to be instantiated; and
   automatically causing at least one of the other objects to be instantiated.

7. The method of claim 6, further comprising determining behavioral trends from the identified user interactions.

8. The method of claim 7, wherein automatically causing at least one of the other objects to be instantiated includes selecting the at least one of the other objects to be instantiated based on the behavioral trends.

9. The method of claim 5, further comprising:
   at a later time, identifying a user input from the particular user causing the operating system object on the computing device to be instantiated; and
   automatically causing at least one other instantiated object to be shut down.

10. The method of claim 1, further comprising:
at a later time, identifying a user input from the particular user causing the operating system object on the computing device to be instantiated;
analyzed the identified user interactions stored in correlation with the operating system object; and
determining whether to open or to shut down at least one of the other objects.

11. A computer-implemented system, comprising:
a computer operating system;
a plurality of objects defined by the computer operating system and accessible to a user of a device that runs the operating system; and
a contextual information data store containing a plurality of instances of user interactions with at least one of the plurality of objects,
wherein each instance of user interaction is correlated to one or more of the objects, and
wherein each instance of user interaction identifies one or more objects that were active in the operating system when an object that is correlated to the user interaction was first instantiated in the operating system.

12. The computer-implemented system of claim 11, wherein the contextual information data stores behavioral trends determined from the plurality of instances of user interactions with the at least one of the plurality of objects.

13. The computer-implemented system of claim 11, wherein contextual information data store includes one or more actions taken with respect to an object other than an object that is correlated with a particular instance of user interaction, during a period when the object that is correlated with the particular instance of user interaction was active in the operating system.

14. The computer-implemented system of claim 13, wherein the one or more actions includes one of opening and shutting down the object other than the object that is correlated with the particular instance of user interaction.

15. The computer-implemented system of claim 13, wherein the contextual information data store further contains information that defines a state of objects that are open on the computing device during a period when an object that is correlated with a particular instance of user interaction was active in the operating system.

16. A computer-implemented system, comprising:
a computer operating system;
a plurality of objects defined by the computer operating system and accessible to a user of a device that runs the operating system; and
means for correlating an instance of a user interaction with at least one of the plurality of objects,
wherein each instance of user interaction identifies one or more objects that were active in the operating system when an object that is correlated to the user interaction was first instantiated in the operating system.

17. The computer-implemented system of claim 16, wherein the contextual information data stores behavioral trends determined from the plurality of instances of user interactions with the at least one of the plurality of objects.

18. The computer-implemented system of claim 16, wherein contextual information data store includes one or more actions taken with respect to an object other than an object that is correlated with a particular instance of user interaction, during a period when the object that is correlated with the particular instance of user interaction was active in the operating system.

19. The computer-implemented system of claim 18, wherein the one or more actions includes one of opening and shutting down the object other than the object that is correlated with the particular instance of user interaction.

20. The computer-implemented system of claim 16, wherein the contextual information data store further contains information that defines a state of objects that are open on the computing device during a period when an object that is correlated with a particular instance of user interaction was active in the operating system.

* * * * *